United States Patent [19]
Allaei

[11] Patent Number: 6,116,389
[45] Date of Patent: Sep. 12, 2000

[54] APPARATUS AND METHOD FOR CONFINEMENT AND DAMPING OF VIBRATION ENERGY

[75] Inventor: Daryoush Allaei, Shorewood, Minn.

[73] Assignee: Quality Research, Development & Consulting, Inc.

[21] Appl. No.: 09/074,847

[22] Filed: May 8, 1998

Related U.S. Application Data

[63] Continuation-in-part of application No. 08/850,285, May 5, 1997, Pat. No. 6,032,552, which is a continuation-in-part of application No. 08/512,070, Aug. 7, 1995, abandoned.

[51] Int. Cl.$^7$ ........................................................ F16F 7/10
[52] U.S. Cl. ........................ 188/378; 384/99; 123/192.1
[58] Field of Search .................... 188/378, 379, 188/380; 248/550, 562, 566; 52/167.8; 464/180

[56] References Cited

U.S. PATENT DOCUMENTS

| | | | |
|---|---|---|---|
| 3,054,284 | 9/1962 | Ciringione et al. | 73/67.2 |
| 3,322,474 | 5/1967 | Destival | 308/26 |
| 3,568,962 | 3/1971 | Janssen | 248/15 |
| 3,693,402 | 9/1972 | Jones | 73/11 |
| 3,756,672 | 9/1973 | Hibner | 308/26 |
| 3,866,480 | 2/1975 | Elliston | 74/87 |
| 4,011,397 | 3/1977 | Bouche | 174/42 |
| 4,105,265 | 8/1978 | Stahlecker | 308/158 |
| 4,150,588 | 4/1979 | Brewer | 74/574 |
| 4,326,158 | 4/1982 | Helgesen | 74/572 X |

(List continued on next page.)

OTHER PUBLICATIONS

Allei, "Vibration and Noise Optimization by 'Smart Design" (1994) Third International Congress on Air–and Structure–Borne Sound and Vibration, (p. 771–778).

Bendiksen, Oddvar O., "Mode Localization Phenomena in Large Space Structures", AIAA Journal (1986).

Bouzit, "Localization of Vibration in Disordered Multi–span Beams with Damping" (1993) ASME, (p. 43–57).

Chen, Pei–Tai and J. H. Ginsberg, "On the Relationship Between Veering of Eigenvalue Loci and Parameter Sensitivity of Eigenfunctions", Journal of Vibration and Acoustics (Apr. 1992), vol. 114, pp. 141–148.

Hodges, C. H. and J. Woodhouse, "Vibration isolation from irregularity in a nearly periodic structure: Theory and measurements", J. Acoust. Soc. AM. (Sep. 1983), vol. 74 (3), pp. 894–905.

Ibrahim, R. A., "Structural dynamics with parameter uncertainties", Appl. Mech. Rev. (Mar. 1987), vol. 40 (3),pp. 309–328.

Photiadis, Douglas M., "Anderson localization of one–dimensional wave propagation on a fluid–loaded plate", J. Acoust. Soc. Am. (Feb. 1992), vol. 91(2), pp. 771–780.

(List continued on next page.)

*Primary Examiner*—Christopher P. Schwartz
*Assistant Examiner*—Devon Kramer
*Attorney, Agent, or Firm*—Fogg, Slifer & Polglaze, P.A.

[57] ABSTRACT

Undesirable vibrations are controlled in a mechanical structure by confining the vibrations to one or more specified areas of the structure and then dissipating the confined energy by damping. Vibration confinement is achieved using a confinement device which effectively applies both translational and torsional forces to the structure. The strength of the translational and torsional forces, and the position of the confinement device are chosen to select a vibrational energy confinement region. Damping elements are concentrated in the vibration confinement region to dissipate the confined vibrational energy. Judicious selection of the confinement region permits the structure to avoid the transfer of vibrational energy to particularly sensitive portions of the structure, or to direct vibrational energy to a portion of the structure. Optimization procedures are presented for designing structures having optimized placement and selection of the vibration confinement device and damping devices.

26 Claims, 17 Drawing Sheets

U.S. PATENT DOCUMENTS

| | | | |
|---|---|---|---|
| 4,489,991 | 12/1984 | Delam | 384/428 |
| 4,872,767 | 10/1989 | Knapp | 384/99 |
| 4,922,869 | 5/1990 | Kadomukai et al. | 123/192 R |
| 5,056,487 | 10/1991 | Yamakado et al. | 123/436 |
| 5,185,543 | 2/1993 | Tebbe | 74/574 X |
| 5,303,681 | 4/1994 | Crofts | 74/547 X |
| 5,401,009 | 3/1995 | Cunningham et al. | 267/141.1 |
| 5,553,514 | 9/1996 | Walkowc | 74/574 |
| 5,864,273 | 1/1999 | Dean et al. | 335/216 |

OTHER PUBLICATIONS

Shih, T. S. and D. Allaei, "On the Free Vibration Characteristics of Annular Plates with Ring–Type Elastic Attachments", Journal of Sound and Vibration (1990), vol. 140 (2), pp. 239–257.

Triantafyllou, "Frequency Coalescence and Mode Localization Phenomena: A Geometric Theory" (1991) Journal of Sound and Vibration, (p. 485–500).

Yigit, A. S. and S. Choura, "Vibration Confinement in Flexible Structures Via Alteration of Mode Shapes by Using Feedback", Journal of Sound and Vibration (1995), vol. 179(4), pp. 553–567.

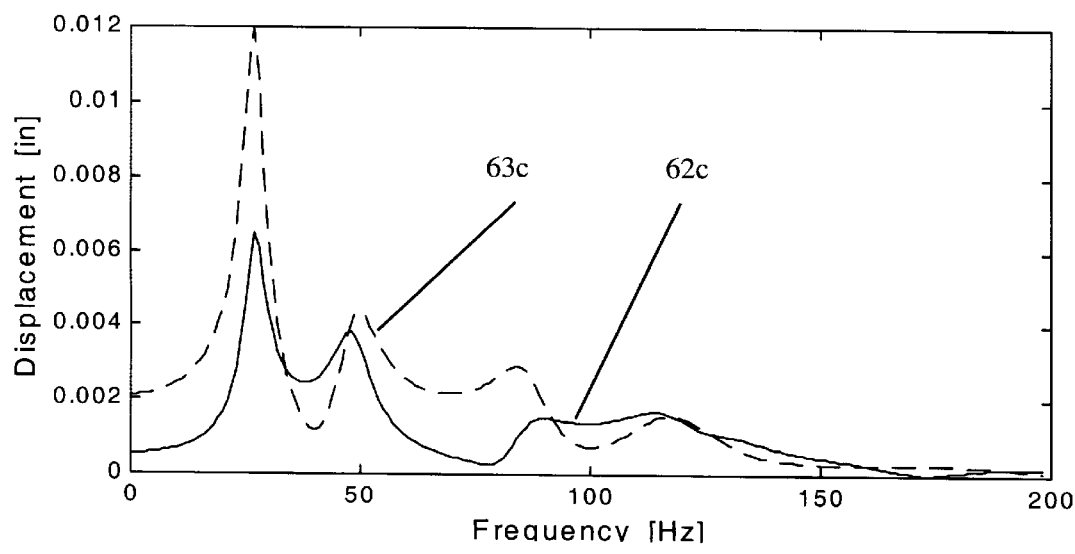
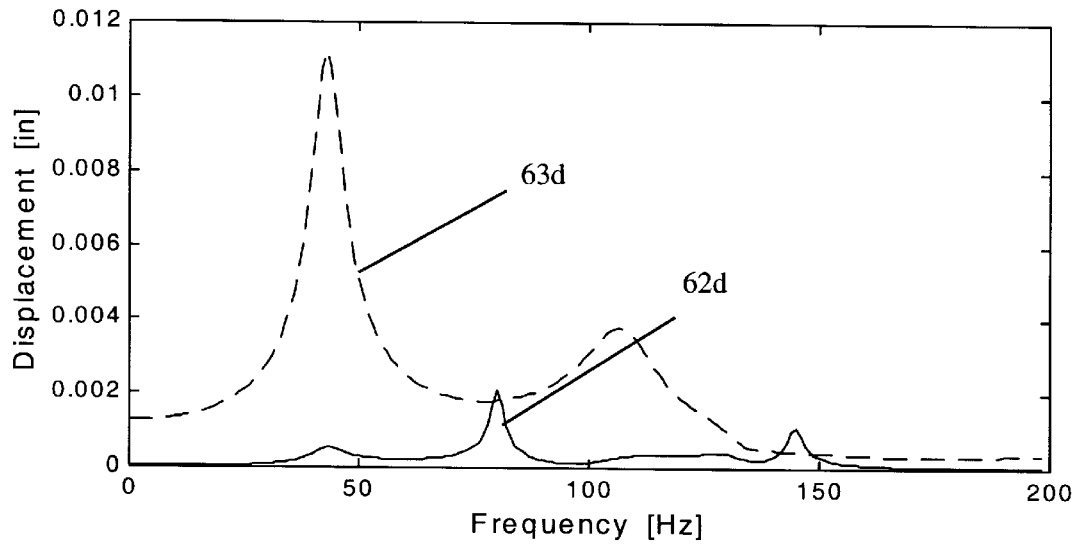

APPARATUS AND METHOD FOR CONFINEMENT AND DAMPING OF VIBRATION ENERGY

CROSS-REFERENCE TO RELATED APPLICATION

This is a continuation-in-part of application Ser. No. 08/850,285, filed on May 5th, 1997 now U.S. Pat. No. 6,032,552, which is a continuation-in-part of application Ser. No. 08/512,070, filed Aug. 7, 1995, now abandoned.

STATEMENT AS TO RIGHTS OF INVENTIONS MADE UNDER FEDERALLY SPONSORED RESEARCH AND DEVELOPMENT

The U.S. Government has a paid-up license in this invention and the right in limited circumstances to require the patent owner to license others on reasonable terms as provided for by the terms of (Contract No. DAAH01-94C-R001) awarded by DARPA (DOD) Defense Small Business Innovation Research Program.

BACKGROUND

1. Field of the Invention

The present invention is directed generally to the control of vibration in structures, and more particularly to the confinement of vibrational energy to selected portions of structures, removing vibrational energy from these selected portions.

2. Description of Related Art

The suppression or control of vibration has an increasing importance in the design, manufacture, operation, maintenance, precision, and safety of structures and machinery. Engineering systems are subjected to numerous disturbances from either internal or external sources of vibration. Conventional methods for reducing the effect of vibration take several forms, and may be classified into the three general categories, viz. 1) isolation, e.g. the use of rubber shock mounts, 2) absorption (redirection), and 3) suppression (dissipation). Conventional active vibration control methods utilize sensors, signal processing, actuators, and power sources to produce forces or strains in the system that counteract the vibration or effectively increase the dissipation in a system.

Many methods have been developed for adding energy dissipating (damping) mechanisms to vibrating systems. Some of the devices for adding passive damping include pneumatic and hydraulic dashpots, fluid layer dampers, viscoelastic and constrained viscoelastic layers, internal and contact mechanical friction, particle damping, impacting masses, magnetic damping, eddy current damping, and piezoelectric dissipation.

Many of the above passive methods may also be made active by enabling the control of specific material or geometric properties of the damping mechanism. Other devices for adding active damping include active constrained layer damping and closed-loop actuator-based damping methods. Closed-loop-based damping methods include feed-back and feed-forward approaches in which sensors are used to determine the vibration state of the structure, and forces dependent upon the sensor output are applied to the structure via an actuator. These forces in turn cancel or dissipate the vibration energy in the structure. "Smart" materials and structures have extended the range of active, as well as passive, vibration control mechanisms, where the term "smart" refers to materials or structures that respond to environmental or operational conditions by altering their material, geometric, or operational properties. Such a response may be triggered both with and without additional control mechanisms (such as a sensory and feed-back loop). Examples of smart materials include piezoceramics, shape memory alloys, electrostrictive and magnetostrictive materials, and rheological and magnetological fluids.

Damping methods incorporating semi-active and hybrid approaches have also been devised. In semi-active approaches, the passive or active damping mechanism may be included or excluded from the control mechanism of the structure based on the response of the structure. The determination of when the damping elements are active may be made in either an active or a passive manner.

Although active control methods have been shown to be effective in some limited applications, their drawbacks are emphasized by a reliance on computationally complex control algorithms, high numbers of sensors and high actuator power requirements, and continuous monitoring and feed-back or feed-forward mechanisms. These drawbacks have demonstrated the need for an alternative or additional approach to vibration control. Additionally, semi-active control techniques reduce only the requirement on continuous actuation but their development and implementation has not yet progressed as far as fully active control or passive control.

There are common features among the above methods. First, they are designed to dissipate vibrations in a reactive manner. The vibration control mechanism acts upon the vibration energy to suppress vibration. Second, these methods are all designed to be most effective in a certain frequency range. Isolators, absorbers, and dampers, whether active or passive, are tuned to a specific frequency range of interest. Active cancellation methods are also limited in their effective frequency range by the speed of signal processing and actuator response time requirements. Third, these methods are designed without regard to the distribution of vibrational energy throughout the system.

It is important for the economic operation and practical implementation of active and passive vibration control technologies that the number of controlled regions and controlling components be reduced so as to achieve the vibration control objectives more effectively and efficiently.

Therefore, there is a need for a method of controlling and dissipating vibrational energy in a system which is proactively designed into the system, and which takes account of total energy distribution throughout the system. There is also a need to expand the frequency range over which vibrational energy is controlled and dissipated. Further, economic considerations drive a need to reduce the number of controlled regions and controlling components and to reduce the complexity of active vibration control systems.

SUMMARY OF THE INVENTION

Generally, the present invention relates to a method of controlling the distribution of vibrational energy throughout a structure, a structural component, or a machine, hereafter referred to as the "system", and of dissipating that vibrational energy. The method of controlling the distribution of energy, includes selecting a confinement region in a vibrating member in which the vibrational energy is to be confined. A vibration confining device is located on the vibrating member at a determined position to define the vibration confinement region. Damping elements are concentrated in the confinement region to dissipate the vibration energy confined there.

The confinement device may be passive, active, semi active or hybrid. In an active confinement device the location of the device on the structure or the confining forces applied to the structure are actively adjustable. Additionally, the damping element may be passive, active, semi passive or hybrid.

The combination of vibration control by confinement (VCC) and the Concentration of Damping Elements (CDE) offers many advantages over conventional vibration damping methods including more effective reduction of steady-state vibrations, transient vibrations, and random vibrations, a higher vibration decay rate, the effective application of damping mechanisms to off-resonance conditions, and a reduction in the number of necessary damping elements or the amount of damping material through enhance damping performance. Moreover, vibration modes and frequencies and acoustic radiation patterns may be tailored to meet a particular application requirement.

A procedure is presented for optimizing vibration confinement in a structure to a user's requirements. The procedure includes inputting a) structural and material specifications for the structure, b) optimization parameters related to the structure and ranges for the optimization parameters and c) vibration confinement requirements for the vibration confinement region. The vibration response for the confined and unconfined regions of the structure is calculated for different values of the optimization parameters. It is then determined, for different values of the optimization parameters, whether the vibration confinement requirements are satisfied using the calculated vibration response. Sets of optimization parameters that satisfy the vibration confinement requirements are stored and an output set of optimization parameters from the stored sets of optimization parameters is selected.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 7A–7D illustrate the vibrational displacement of test points on the vibrating plate of FIGS. 6A–6D under different combinations of vibration confinement and damping, where a continuous vibration force is applied;

Figure 1:
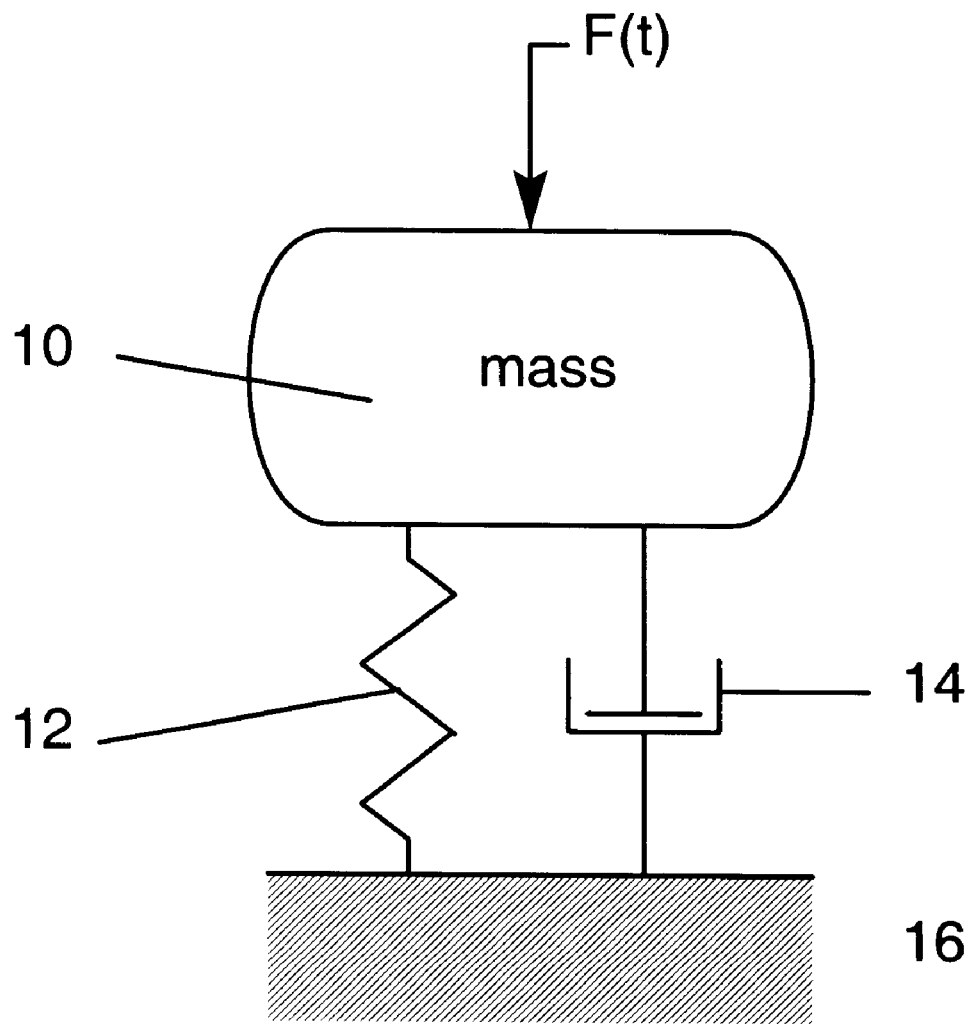
FIG. 1 shows a schematic model of a vibration damping element.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is applicable to the control of vibrations in mechanical structures, machines and systems, and is concerned with confining vibrational energy to selected portions of the structure, machine or system. This approach may allow for the compensation of the deficiencies of prior art approaches and, therefore, may improve the effectiveness of the vibration control systems and reduce the costs of implementation and operation.

It has been long recognized that passive damping mechanisms are most effective near system resonances where most strain energy is stored and where the most kinetic energy is present. This is because the vibrating system delivers most of the vibrational energy to the damping mechanism at the resonance frequencies. Conventional viscous damping mechanisms are velocity-dependent elements; the system response velocity is greatest near the system's natural frequencies. In the case of strain- or shear-dependent damping elements, the highest strain and shear in a structure occur when the system is in resonance. Because of this resonant characteristic of damping mechanisms, vibration damping has traditionally targeted specific and limited resonance frequencies or modes of vibration. In many systems, damping mechanisms are tuned to target only one mode of vibration. This characteristic of conventional damping methods limits the frequency range in which they are effective.

The present invention provides a method for dissipating vibrational energy within mechanical structures, including rod-, beam-, shaft-, plate-, and shell-type structures, or various combinations thereof. Vibration energy is confined to a pre-selected region of a mechanical system. This procedure is known as Vibration Control by Confinement (VCC), and is described in related U.S. patent application Ser. No. 08/850,285, incorporated herein by reference. The vibration energy is then dissipated through one or more damping mechanisms. An increased concentration of vibration energy delivered to the damping mechanisms mimics the condition of vibration resonance and improves the performance of the damping mechanisms. Several advantages are afforded by the combination of VCC and Concentrated Damping Elements (CDE), including more effective reduction of steady-state, random, and transient excitations than when using conventional damping mechanisms alone, and vibration levels decay more quickly than with conventional damping alone. Also, the number of discrete or distributed dampers may be reduced, the amount of damping material decreased, and the performance of the damping element may be increased. Moreover, the vibratory and acoustic responses of the system may be tailored to achieve desired characteristics by targeting specific vibrational modes, frequencies, and acoustic radiation patterns. The combination of VCC and CDE (VCC-CDE) may be used to improve the performance of current vibration, noise, and acoustic damping techniques as applied to mechanical systems, and extend the applications of damping mechanisms to off-resonance conditions.

Embodiments of the invention may find utility in a number of structures and machines, including buildings, bridges, space structures, automobiles, trucks, tractors, aircraft, seacraft, telescopes, microscopes, marine craft, data reading and writing devices, electronic enclosures, imaging devices, robots, and other machinery. This list is not intended to be limiting, but merely to be illustrative of the wide range of applicability of the invention.

The present invention is based on the confinement of vibration energy to one or more specific regions of a mechanical system, using vibration control by confinement, as discussed in "Vibration Control by Confinement of Vibration Energy", U.S. patent application Ser. No. 08/850,285, filed by the same inventor as the present application on May 5, 1997, and incorporated herein by reference. The vibrations may be confined using passive, active, semi-active, or hybrid techniques. Once the vibration has been confined to a predetermined region, the damping mechanism is concentrated in the region of confined vibration via Concentrated Damping Elements (CDE).

Figure 2:
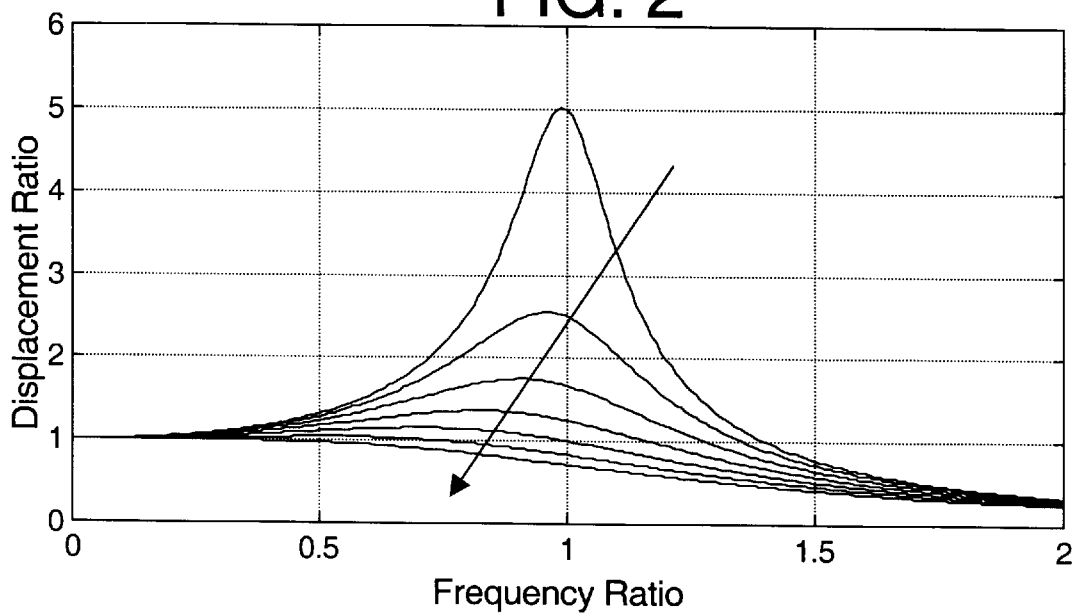
FIG. 2 illustrates the displacement ratio plotted against dimensionless frequency for several different levels of damping.
Figure 3:
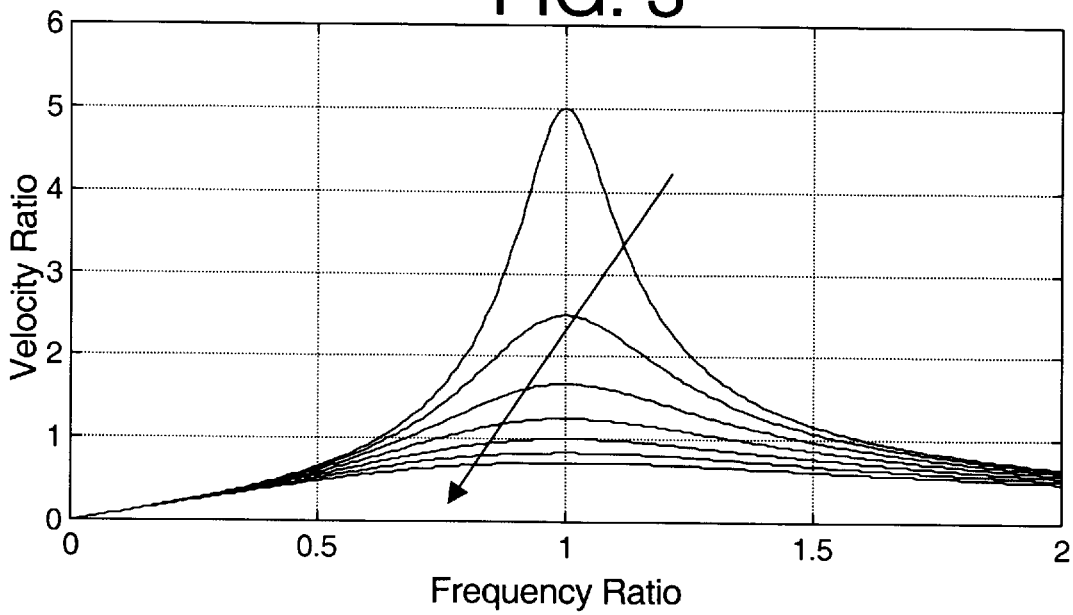
FIG. 3 illustrates the velocity ratio plotted against dimensionless frequency for several different levels of damping.

Passive damping mechanisms are typically most effective near a system resonance. A vibrating system and the effect of increasing damping on its harmonic displacement and velocity responses are shown in FIGS. 1–3, respectively. An exemplary model of a physical single-degree-of-freedom vibration system is illustrated in FIG. 1. The model includes a mass 10, an elastic support 12, and viscous-type damper 14 resting on a grounded base 16. A sinusoidal force, F(t), having a magnitude $F_0$ and frequency $\omega$, $F(t)=F_0\sin(\omega t)$, is applied to the mass 10. The damping force of the viscous-type damper 14 acting on the mass 10 is velocity dependent. It will be appreciated that such a model effectively models real vibrating systems. Examples of viscous-type dampers include dashpots (hydraulic and pneumatic), such as the E9 series produced by Airpot Corp. and the model PAL 18 produced by Fabreeka. Other manufacturers of dashpots include Firestone, Suspa, Taylor Devices and Vibratech.

It will be appreciated that other types of dampers may be used for removing vibration energy from a vibration-confinement region. For example, fluid layer, viscoelestic layer and constrained layer dampers may also be used. Additionally, particle damping and mass-tuned damping, for example as implemented by Ishikawajima-Harima Heavy Industries Co. Ltd., may also be used. The type of damping implemented in the structure is a matter of engineering choice and is not intended to limit the invention.

The normalized displacement response magnitude of the mass 10 is shown, in FIG. 2, as a function of the frequency ratio. The normalized displacement response is defined as the ratio of dynamic displacement to static displacement (the displacement of mass 10 under a static load of magnitude $F_0$). The frequency ratio is defined as the ratio of the excitation frequency to the system's natural frequency. The displacement ratio is plotted against the frequency ratio for different levels of damping, increasing in the direction of the arrow. This plot shows that an increase in damping has its most significant effect in the frequency range near resonance (near a frequency ratio of value 1), the frequency of maximum displacement.

Conventional viscous-type damping mechanisms are velocity-activated elements and the system response velocity of the mass 10 is greatest at the natural frequency, as illustrated in FIG. 3, a plot of the normalized velocity as a function of frequency ratio. The normalized velocity is defined as the ratio of the dynamic velocity to the product of static displacement and natural frequency. The normalized velocity is shown plotted against the frequency ratio for different levels of damping, increasing in the direction of the arrow. As a result of this frequency-dependent characteristic, vibration suppression through damping (velocity-dependent) has traditionally targeted specific, limited natural frequencies or modes of vibration. Conventional types of dissipation mechanisms mentioned in the prior art have similar relationships between frequency and damping effectiveness.

The benefits of VCC-CDE are illustrated when two types of vibratory excitations are considered. For harmonic excitation, for example a sinusoidal excitation at a single frequency, the response of the system depends upon the participation of different vibration modes. The extent to which each vibration mode contributes to the total vibration response is dependent upon the location of the applied force and its frequency. When the vibration response is dominated by modes whose vibration is confined to a particular spatial region, for example using VCC, the total vibrational response is confined, and the displacement of the system in the confined region is larger than for an equivalent non-confined system whose energy is distributed throughout the system. For such a harmonic excitation, the energy dissipated by a viscous damper in one complete cycle, $\Delta W$, is expressed by:

$$\Delta W = \pi \cdot c \cdot \omega_e \cdot X^2 \tag{1}$$

where c is the system damping constant, $\omega_e$) is the excitation frequency, and X is the amplitude of the displacement response. The application of VCC results in higher displacements at the region where damping is concentrated. Since the energy dissipated by the damping mechanism is proportional to the square of the displacement, X, more energy may be dissipated per cycle in the VCC-CDE system than in a non-confined system. Thus, energy may be removed faster from a confined system than the nonconfined system.

For a transient response due to an impulse-type excitation, the total vibratory response of the system again depends on the vibration modes, each mode participating to its own extent and at its own natural frequency, based upon the temporal characteristics of the excitation and its location. Again, if the modes of the system are confined, the total response may also be confined. Therefore, the vibrational energy of the system is focused to the confinement region, where the damping elements are concentrated, and more energy is available for the damping mechanism to dissipate. The rate at which vibration energy is dissipated in the transient response to excitation is given by the relation $$\text{transient decay} = e^{-\zeta \omega_n t} \quad (2)$$

where e is the exponential function, $\zeta$ is the system effective damping factor, $\omega_n$ is the natural frequency, and t is time. In the case of VCC-CDE, damping mechanisms are located where they are most active, in regions of relatively high vibration. Damping mechanisms placed in regions of relatively low vibration typically do not contribute significantly to the effective damping of the entire structure. Thus, for VCC-CDE, the effective damping factor, $\zeta$, is larger than in non-confined approaches and transient vibrations are, therefore, dissipated at a higher rate.

In view of the above, the energy dissipation capability of damping mechanisms is reduced when placed in regions of low vibration energy. When vibrations are confined, there is less need to include damping mechanisms in regions of suppressed vibration, advantageously reducing the number of damping components needed, while maximizing the performance of damping components in the confined region.

FIGS. 14–16 illustrate various practical examples of the implementation of vibration confinement and the concentration of damping elements (VCC-CDE).

Figure 14A:
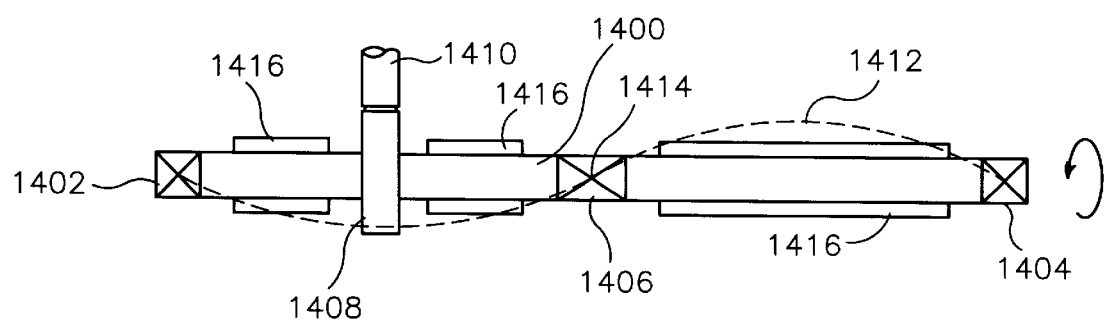
FIGS. 14A and 14B illustrate an application of one particular embodiment of the present invention to reduce vibration in a rotating shaft.

In FIG. 14A, a shaft 1400 is supported between two end bearings 1402 and 1404. A centrally located bearing 1406 provides support to a center portion of the shaft 1400. A gear 1408 is located on the shaft and meshes with another gear 1410, only a portion of which is illustrated. One possible mode of vibration is illustrated by the dashed line 1412 whereby a vibration node 1414 is located at each of the bearings 1402, 1404, and 1406. Where such vibration goes unchecked, the shaft 1400 and gears 1408 and 1410 see significant wear and reduction in useful life. Accordingly, the conventional approach to reducing wear is to apply some vibration damping along the length of the shaft 1400. For example, one conventional approach may be the application of damping material 1416 along the length of the shaft as illustrated.

Figure 14B:
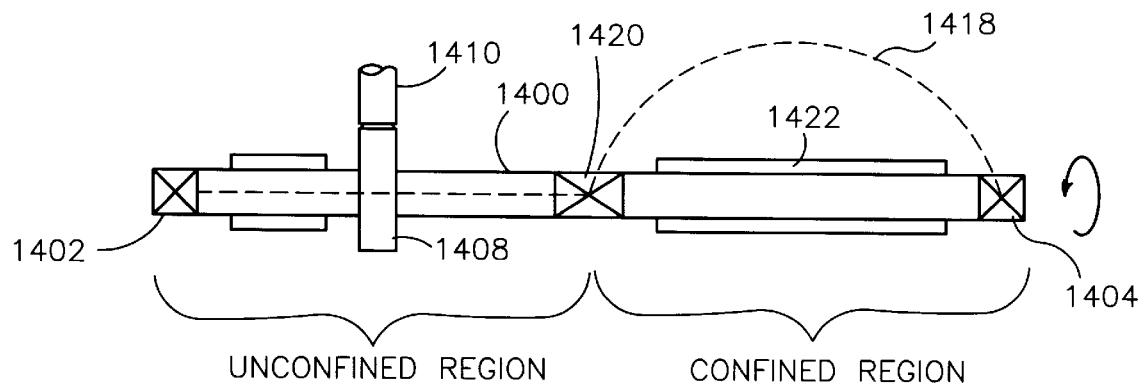

In the VCC-CDE approach, illustrated in FIG. 14B, the vibration energy of the shaft 1400 is confined to the confined region by a vibration confinement device, for example in a manner as described in US patent application Ser. No. 08/850,285. In the particular example illustrated, the bearing 1420 that is centrally located along the shaft 1400 provides vibration confinement, thus there is little vibration energy in the portion of the shaft where the gear 1408 is located, as illustrated by the dashed line 1418. The vibrational energy of the shaft 1400 is confined to the portion to the right of the vibration confining bearing 1420 and so vibration damping material 1422 is located only on that portion of the shaft 1400 where vibration energy is present.

It can be seen that the implementation of VCC-CDE reduces the amount of vibration damping material that has to be applied to the shaft 1400 in order to obtain the desired performance. Additionally, the vibrational energy is more effectively damped by the material 1422 in the VCC-CDE case than in the conventional case. It will be appreciated that other vibration confinement devices may also be used in additional to the vibration confining bearing 1420 illustrated.

Figure 15A:
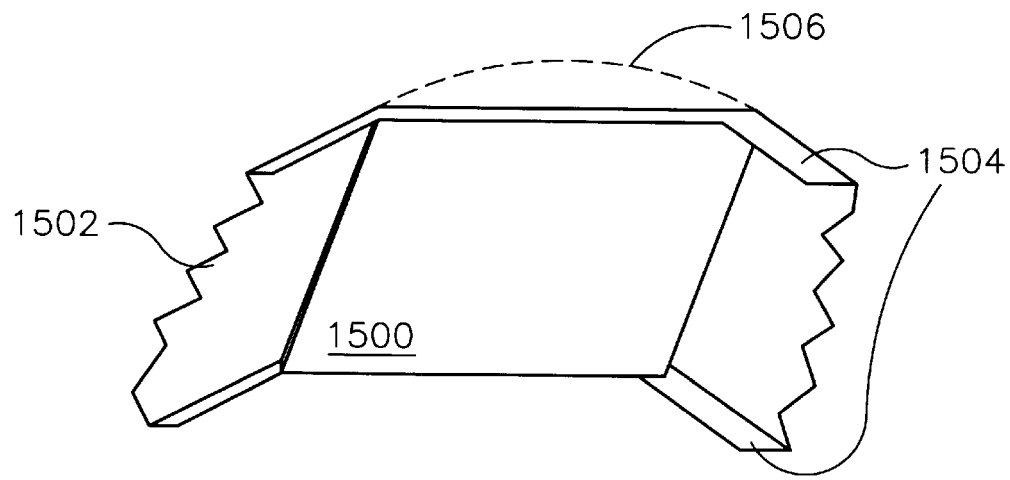
FIGS. 15A and 15B illustrate an application of another embodiment of the present invention to reduce vibration in a car roof.
Figure 15B:
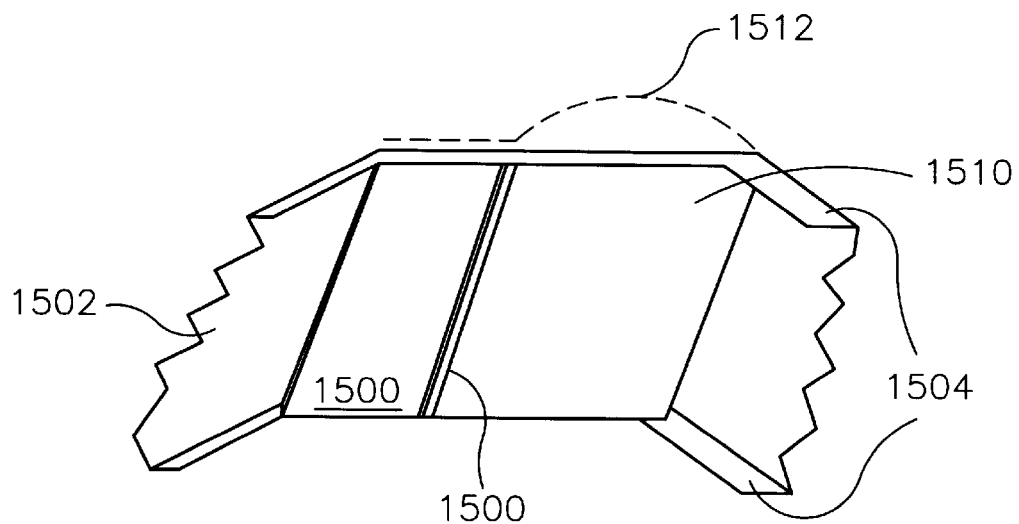

FIG. 15A and 15B illustrate the application of VCC-CDE in practical situation where the vibrating element may be effectively modeled as a vibrating plate. In this case, the vibrating structure is a car roof 1500 and is illustrated as viewed from a low position, looking up to the lower surface of the car roof. The front windshield is located at position 1502 and the rear supports for the car roof are located at positions 1504. The dashed line 1506 schematically illustrates one vibration mode of the roof where there is no displacement of the roof 1500 at the edges and maximum displacement at the roof center. In this conventional situation, vibration damping material is typically provided over the entire lower surface of the roof 1500.

FIG. 15B illustrates a car roof 1500 having front supports and rear supports 1504, where VCC-CDE has been implemented by rib 1508 positioned across the interior of the roof surface. The rib 1508 confines vibrational energy, schematically illustrated as dashed line 1512, to the rear portion of 1510 roof 1500 in a manner analogous to that described in application Ser. No. 08/850,285 with respect to FIGS. 7A to 7C. Accordingly, vibration damping material may be placed in the right portion 1510 of the roof 1500 to effectively damp out the vibrational energy in the car roof. The application of VCC-CDE using the rib 1508 permits confinement of the vibration to only a fraction of the car roof 1500 and therefore the amount of damping material required to damp out the vibrational energy is reduced from the conventional case illustrated in FIG. 15A where damping material is used throughout the entire car roof.

Figure 16A:
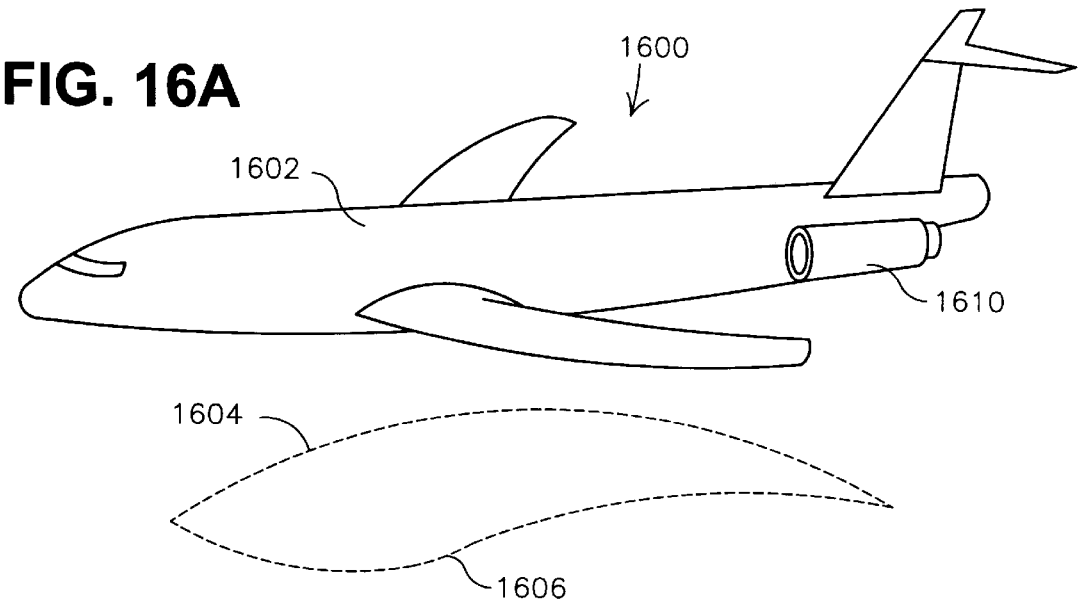
FIGS. 16A and 16B illustrate an application of another embodiment of the present invention to reduce vibration in an aircraft fuselage.
Figure 16B:
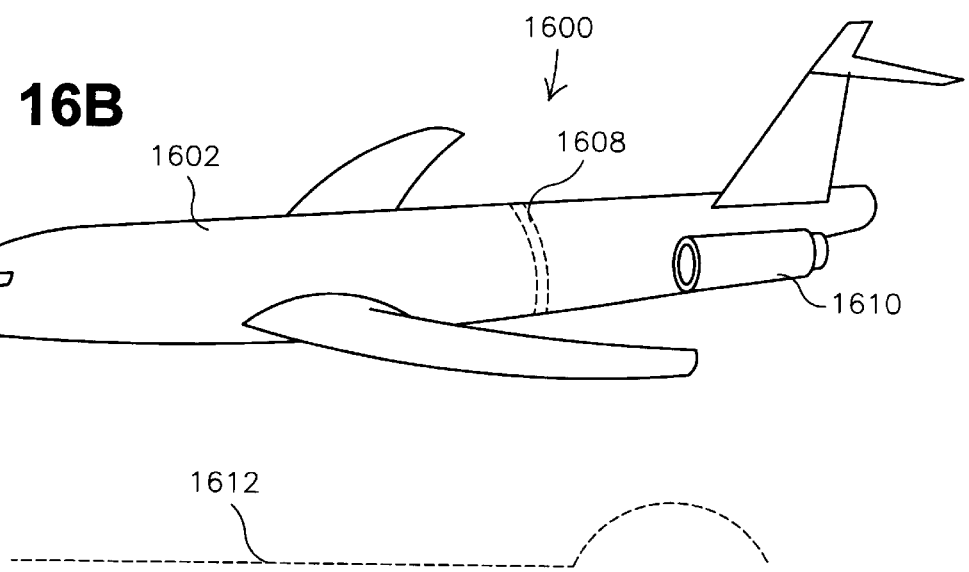

FIGS. 16A and 16B illustrate a practical example of the implementation of VCC-CDE in an aircraft fuselage. A structure like an aircraft fuselage may be effectively modeled as a cylindrical shell, similar to the cylindrical shell structure illustrated in FIGS. 8A to 8C in application Ser. No. 08/850,285. FIG. 16A illustrates an aircraft 1600 having a fuselage 1602 where there is no vibration confinement. The dashed lines 1604 and 1606 schematically illustrate that vibrations are free to propagate throughout the entire length of the fuselage 1602. Typically, vibration damping is distributed throughout the fuselage 1602 to reduce vibration throughout its entire length.

FIG. 16B illustrates an aircraft 1600 having a fuselage 1602 that has a vibration confinement device 1608 situated forward of the engine 1610. The vibration confinement device 1608 may be a ring structure disposed on the inner surface of the fuselage 1602, for example as discussed with respect to the cylindrical shell illustrated in FIGS. 8A to 8C in application Ser. No. 08/850,285. The vibration confinement device 1608 effectively confines vibrational energy arising from the airplane's engines 1610 to the rear portion of the fuselage 1602, as schematically illustrated by the dashed line 1612, which represents an approximation of the distribution of vibration energy along the length of the fuselage. By confining vibration to the rear portion of the fuselage 1602, vibration damping devices only have to be located in the rear portion of the fuselage 1602, rearward of the vibration confinement device 1610. Accordingly, this affords a significant saving in the weight of the aircraft 1600 since there is no requirement for damping structure or damping material to be disposed in the fuselage 1602 forward of the vibration confinement device 1610.

These examples are given merely to illustrate the applicability of VCC-CDE to a wide variety of different mechanical structures, such as shaft or rod-like structures, plate-type structures, and shell-type structures, and are not intended to limit the scope of the invention. It will be appreciated that VCC-CDE may be applied to many other types of mechanical structure. In addition, it will be appreciated that different vibration confinement devices and damping devices may be used for each of the three examples illustrated in FIG. 14 to 16.

Figure 4:
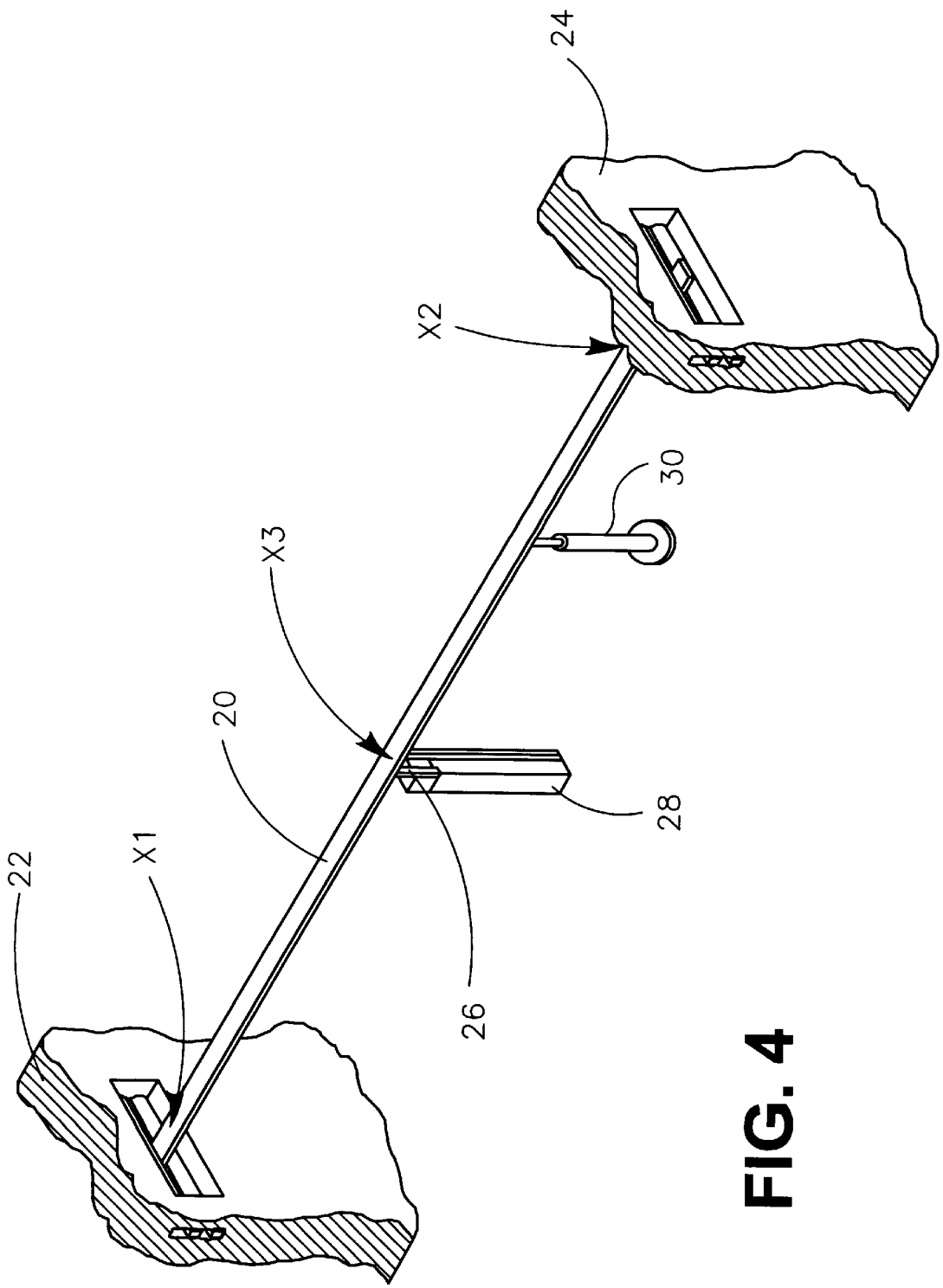
FIG. 4 is a view of a beam structure with a vibration confinement device for confining vibrational energy and a damping element according to an embodiment of the present invention.

Turning to a more detailed description of vibration confinement and damping, consider now the beam 20 illustrated in FIG. 4. VCC-CDE is illustrated in FIG. 4 for a beam 20. The beam 20 is supported between first and second fixed supports 22 and 24. The first and second supports 22 and 24 define the boundary conditions of the beam's vibrations. As shown, the supports 22 and 24 do not permit translation of the beam 20 at the supported positions x1 and x2, respectively. This boundary condition may be stated mathematically as u(x1)=u(x2)=0, where u(x) is the vertical translation of the beam from an equilibrium position at a point x along the beam 20. If the supports 22 and 24 permit rotation of the beam 20 at the supported points x1 and x2, then the boundary conditions also include the conditions that $\partial u(x1)/\partial x$ and $\partial u(x2)/\partial x$ are not constrained. A blade-type vibration confinement device 26 is located at a position x3 on the beam 20. One end of the blade-type device 26 is fixed to the beam 20 and the other end is fixed to the confinement device support 28. The blade-type device 26 provides vibration confinement in the beam 20 by restraining the value of u(x3) by stretching and compressing the blade-device 26, and the value of $\partial u(x3)/\partial x$ through the resistance of the blade-type device 26 to bending (torsional stiffness).

A damping element 30, illustrated as a dashpot, is positioned along the beam 20 between points x2 and x3. For increased damping effect, the damping element 30 may be positioned at the point between x2 and x3 where the displacement is a maximum ($\partial u/\partial x=0$).

Figure 5:
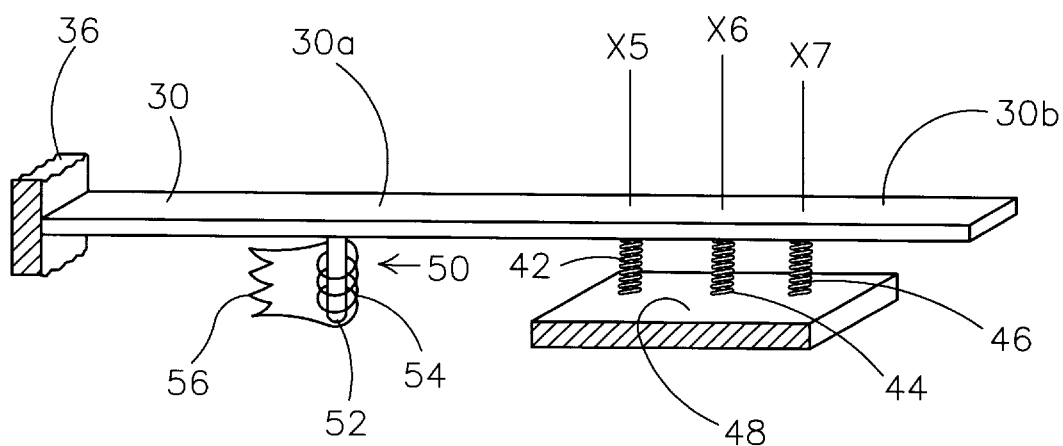
FIG. 5 illustrates a cantilevered beam structure having a multiple-spring vibration confinement device and a vibration damper according to another embodiment of the invention.

FIG. 5 illustrates another embodiment of VCC-CDE applied to a beam-type structure. Here, a cantilevered beam 30 is rigidly attached to a support 36 at one end. Three longitudinal springs 42, 44, and 46 are rigidly attached to the lower surface of the beam 30. The other ends of the springs 42, 44, and 46 are attached to a rigid support member 48. The combination of springs 42, 44, and 46 provides both translational and torsional forces on the beam 30 and, therefore, confines vibrations in the beam to either the left portion 30a or the right portion 30b. In this example, it is assumed that vibration energy is concentrated in the left portion 30a.

A damping element 50 is disposed along the left portion 30a, preferably at the position where the vibrational translation of the beam 30 is at a maximum. In this case, the damping element 50 is an electromagnetic damper, including a magnet 52 moveable within an external coil 54. The coil 54 is shorted through a resistor 56, so that current, generated by the coil 54 as a result of movement of the magnet 52, is dissipated in the resistor. Thus, when the left portion 30a vibrates, the magnet 52 vibrates within the coil 54. The current induced in the coil 54 is damped by the resistor 56 and the vibration energy is thus dissipated.

Figure 8A:
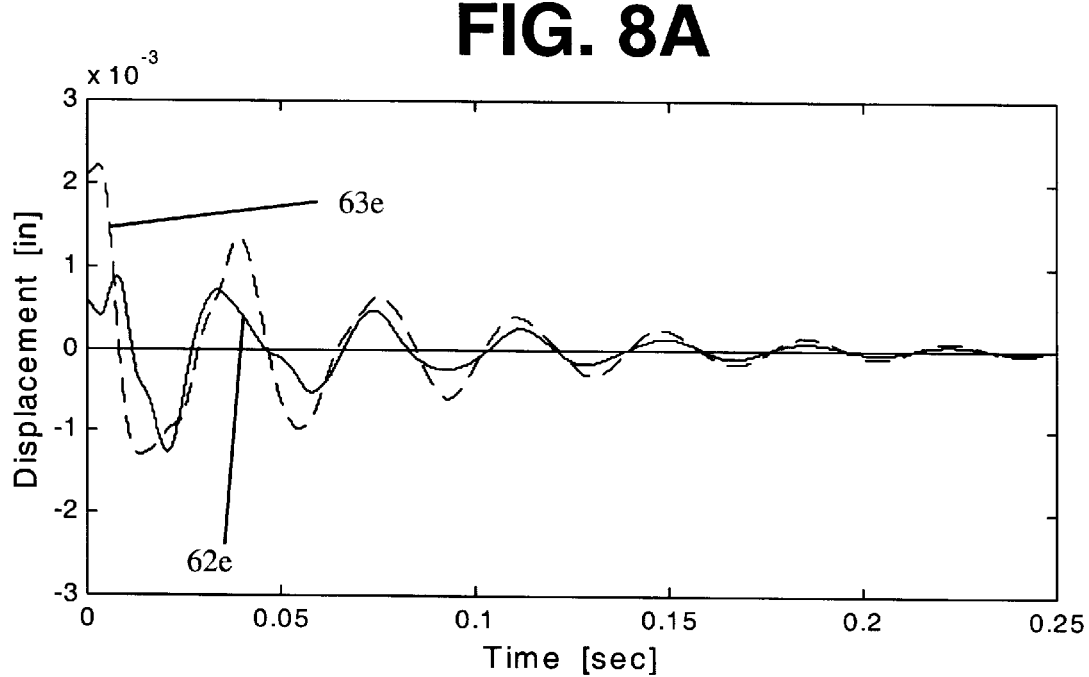
FIGS. 8A and 8B illustrate the vibrational displacement of test points on the vibrating plate of FIGS. 6A–6D under different conditions of vibration confinement and damping where an impulsive vibration force is applied.
Figure 8B:
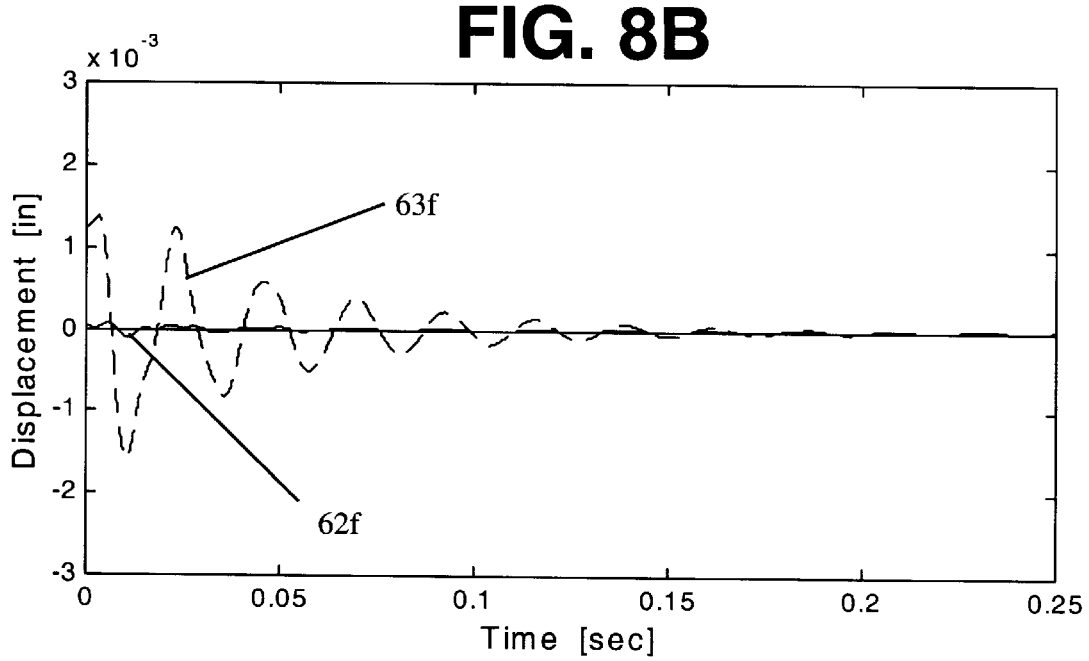
Figure 9:
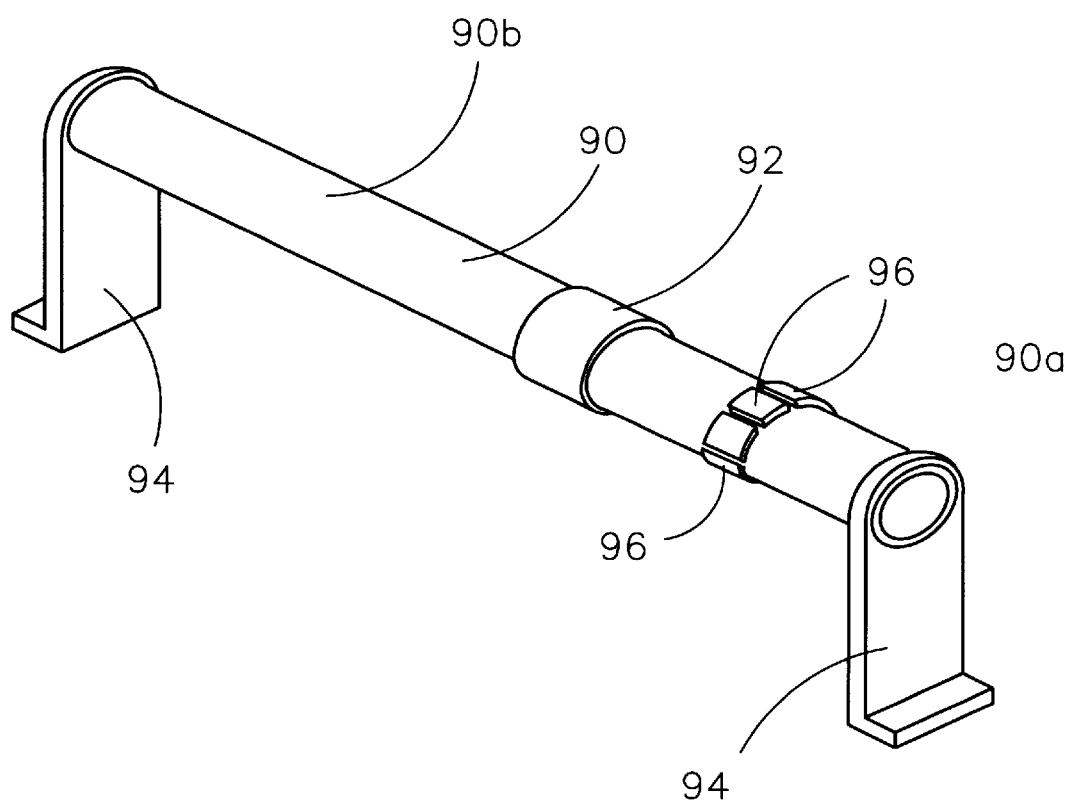
FIG. 9 illustrates a cylindrical shell having vibration confinement and concentrated damping elements.

FIGS. 6A–6D illustrate panel-type structures having different vibration control treatments and FIGS. 7–9 illustrate various vibration responses of the panels shown in FIGS. 6A–6D.

Figure 6A:
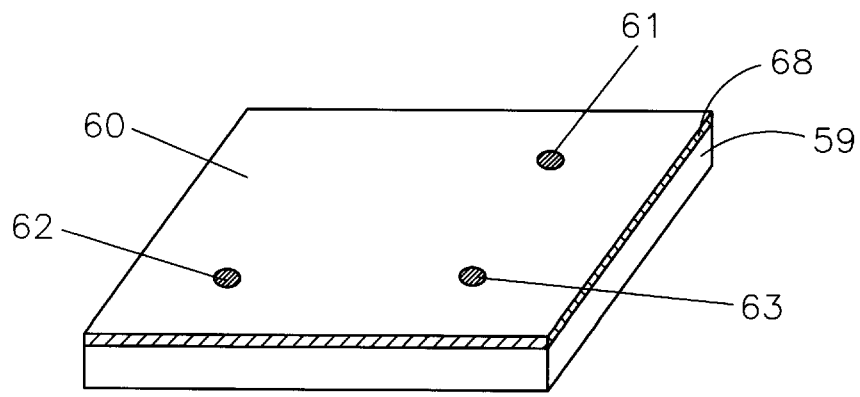
FIGS. 6A–6D illustrate a vibrating plate having different combinations of vibration confinement and damping.

FIG. 6A depicts a panel-type structure 60 having non-confined modes. The panel 60 is mounted on its edges to a frame 59. In this embodiment, the edge 68 of the plate 60 is firmly attached to the frame 59, for example, by welding, soldering, riveting, bolting or similar attaching method. Thus, the edge 68 is assumed to have no translation and no slope. The panel 60 may be excited with harmonic or impulsive forces at point 61. Vibration responses are recorded at point 62 on the left side of the panel 60 and point 63 on the right side of the panel 60.

Figure 6B:
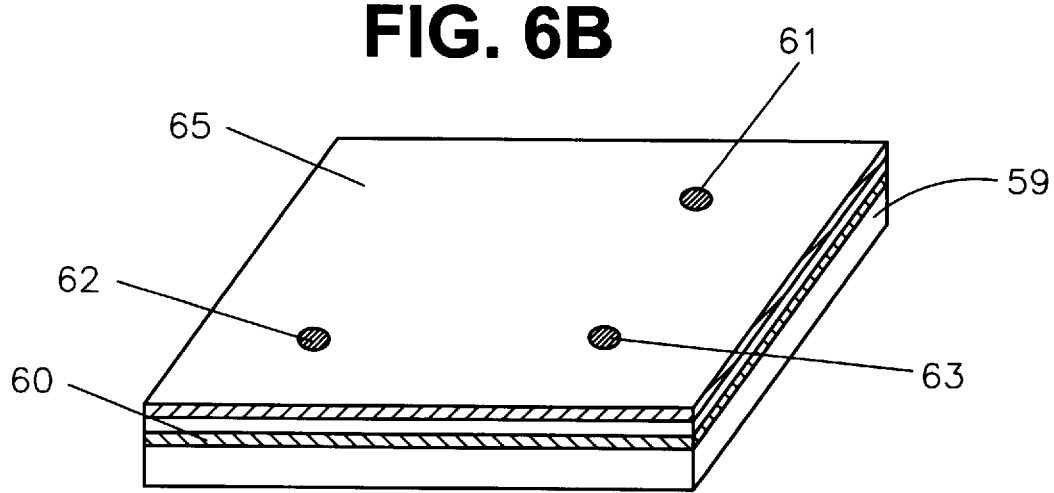

FIG. 6B shows a panel 60 similar to that of FIG. 6A, but with a constrained layer damper 65 covering the entire surface. The panel 60 is excited with harmonic or impulsive forces at point 61. Vibration responses are recorded at point 62 on the left side of the panel 60 and point 63 on the right side of the panel 60. A constrained layer damper includes at least one viscoelastic layer that produces a viscous damping force under shear. Constrained layer dampers are well known, such as the SJ2530 damping material, manufactured by 3M. Other manufacturers of viscoelastic and constrained layer dampers include Lauren Manufacturing Co., CSA Engineering and MSC Laminates and Composites, Inc.

Figure 6C:
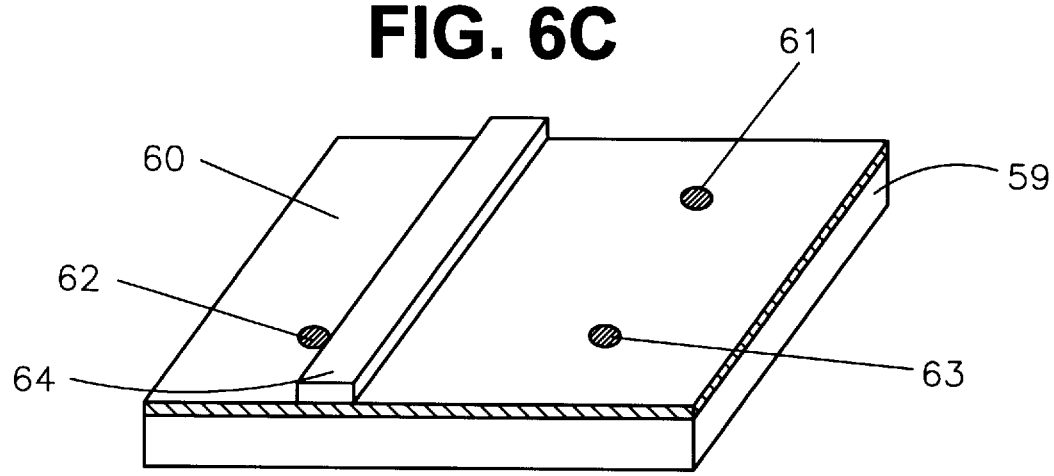

FIG. 6C shows a panel-type structure 60 similar to that of FIG. 6A, but with a confining rib 64 for confining the vibration modes. The panel 60 is excited with harmonic or impulsive forces at point 61. Vibration responses are recorded at point 62 on the left side of the panel 60 and point 63 on the right side of the panel 60. As discussed in application Ser. No. 08/850,285, the panel 60 may be provided with other types of vibration confinement, rather than a confining rib.

Figure 6D:
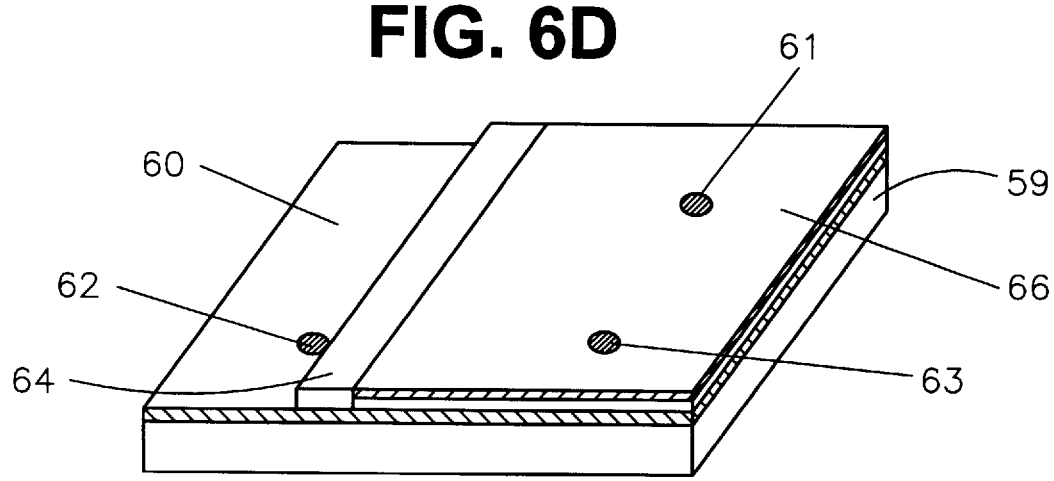

FIG. 6D shows a panel 60 similar to that of FIG. 6C, but with a constrained layer damper 66. The rib 64 induces confined modes in the panel 60. The panel 60 is excited with harmonic or impulsive forces at point 61. Vibration responses are recorded at point 62 on the left side of the panel 60 and point 63 on the right side of the panel.

Figure 7A:
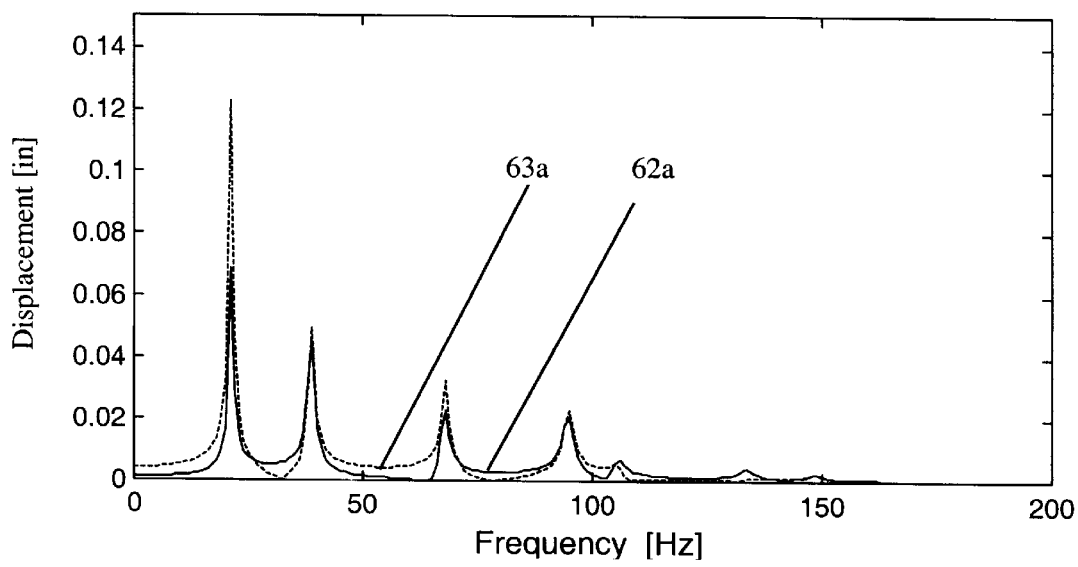

FIGS. 7A–7D show a numerically generated harmonic response of the panel-type structures of FIGS. 6A–6D when subjected to sinusoidal force. FIG. 7A shows the displacement response of the panel 60 of FIG. 6A having non-confined modes and no constrained-layer damper. Two response traces are shown. The first response trace 62a is for the response point 62 on the left side of the panel 60. The second response trace 63a is for the point 63 on the right side of the panel 60. The responses at the two points 62 and 63 are similar in frequency content and have the same order of magnitude.

Figure 7B:
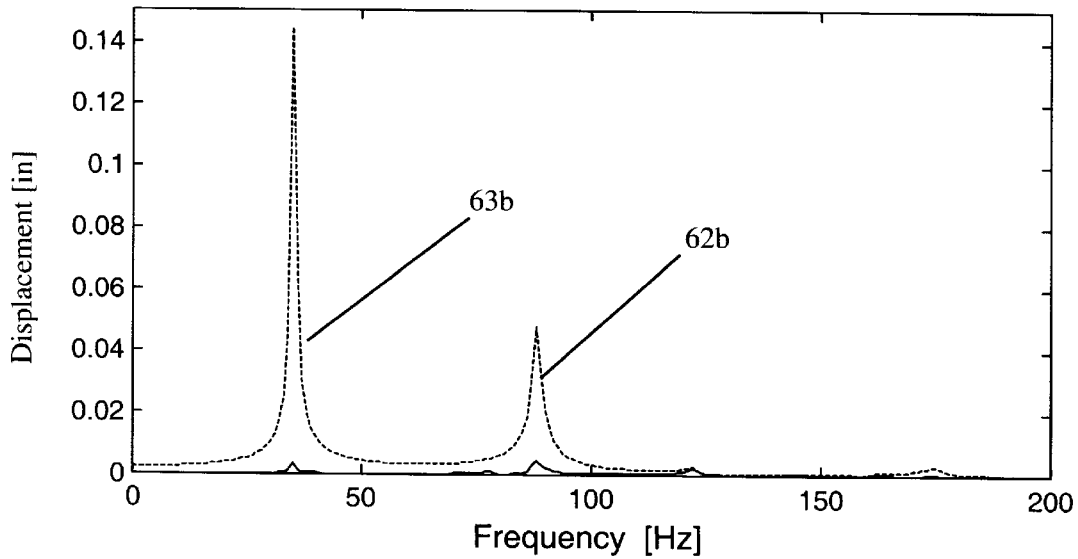

FIG. 7B shows the displacement response of the response points 62 and 63 where the same excitation applied to the panel 60 of FIG. 6C, i.e. a panel having a rib 64 to confine vibration. The magnitudes of the vibration responses at the two response points 62 and 63 are no longer similar. The maximum response at point 62, shown by trace 62b, is more than an order of magnitude smaller than the response at point 63 shown by trace 63b. This occurs because more of the available vibration energy is delivered to, and confined within, the confined region.

A comparison of the harmonic response magnitudes shown in FIG. 7A and FIG. 7B shows a higher response at response point 63 when the vibration modes are confined by the rib 64. This is a typical result of VCC. Thus, more energy is delivered to specific modes of vibration and is concentrated in the regions of confinement. Since VCC results in greater vibration displacements than for non-confined modes, more energy may be delivered to a damping mechanism placed in the confined region and may be dissipated more effectively than when the vibration modes are not confined.

FIG. 7C shows the harmonic response of panel 60 in FIG. 6B, i.e. a panel having non-confined modes and a constrained damping layer 65 covering its entire surface. The traces 62c and 63c represent the vibration responses at points 62 and 63, respectively.

A comparison with the displacements shown in FIG. 7A shows that there is a reduction in the displacement response at both response locations and at all frequencies, particularly near the system resonances (high displacements). This is typical of a panel having damping provided throughout its surface.

FIG. 7D shows the harmonic displacement response of the panel in FIG. 6D, i.e. a panel having a constrained-layer damper 66 covering only a portion of the panel 60. The damper 66 is located in that region of the panel 60 to the right side of the rib 64 where the vibration energy of the panel is concentrated. The response trace 62d illustrates the response for point 62 and trace 63d illustrates the response for point 63. A comparison between the traces shown in FIGS. 7B and 7D shows that the displacement responses for both response points are reduced with the addition of the damping layer. Also, these results show that the response for the panel 60 with non-confined, damped modes (FIG. 7C) is higher than when the panel 60 has vibration modes confined by the rib 64 (FIG. 7D). Damping is more efficient for the confined-mode panel 60 because more energy is delivered to the damping element, in this case the constrained layer 66, through VCC. Damping in this case is more efficient despite the fact that the area of the panel 60 covered by the damping layer 66 in the presence of VCC is substantially less than the area of the panel 60 covered by the damping layer 65 where there is no VCC. Thus, the combination of VCC and CDE produces more effective damping than is afforded by conventional approaches, while using less damping material.

FIGS. 7A–7D also demonstrate the filtering effect VCC has on the modes participating in the response. FIGS. 7A and 7C show that all modes participating in the response of the unconfined panel, as seen by the peaks in the displacement response curves, may be seen at both measurement points 62 and 63. On the other hand, FIGS. 7B and 7D show that only specific modes participate in the response at each measurement point when the vibration is confined. This demonstrates the capability of the VCC method to tailor the modal response of a structure. This result has many potential benefits for noise and vibration control applications because the number of modes participating in the response of a system at specific points, as well as the degree of participation of each mode and its natural frequency, may be controlled.

FIGS. 8A and 8B show a numerically modeled transient response of the panel 60 when subjected to an impulsive force applied at point 61. FIG. 8A shows the displacement response of the non-confined panel 60 of FIG. 6B with a constrained-layer damper 65 covering the entire panel 60. Two response traces are shown. The first trace 62e shows the response for point 62 on the left side of the panel 60. The second trace 63e is the response for the point 63 on the right side of the panel 60. The responses at the two points are similar in magnitude and frequency content.

FIG. 8B shows the response when the same excitation as in FIG. 8A is applied to the panel 60 of FIG. 6D where both VCC and CDE are implemented. The vibration magnitudes at the two response points are no longer similar. The first trace 62f is the response at point 62 on the left side of the plate 60 and is approximately an order of magnitude smaller than the second trace 63f showing the response at point 63. This difference in responses arises because more of the vibration energy is confined by the rib 64, and is quickly damped by the damping layer 66.

A comparison of the magnitudes of the responses shown in FIGS. 8A and 8B shows an overall reduction in the response at both response points 62 and 63 when the modes are confined, which is typical of the effect of VCC. The vibrations in the confined case of FIG. 8B decay more quickly than in the case of the unconfined modes of the panel 60 of FIG. 6B, a result of the use of CDE in conjunction with VCC. More vibration energy is delivered to the damping mechanism through the application of VCC and the vibration energy is dissipated more quickly than for the case whose response is illustrated in FIG. 8A. The faster response decay and lower vibration levels are achieved with the confined modes even though the damping layer 66 only partially covers the panel 60, while for the non-confined modes case, illustrated in FIG. 6B, the damping layer 65 covers the entire panel 60.

It will be appreciated that damping elements may also be applied to shell-type structures, such as the cylinder 90 illustrated in FIG. 9. The cylinder 90 is provided with a vibration confinement device 92, implemented as a tight-fitting collar. The collar 92 separates the cylinder 90 into a right portion 90a and a left portion 90b. The collar 92 confines vibrations in the right portion 90a and substantially prevents the transmittal of vibration energy to the left portion 90b. The cylinder 90 is supported at its extreme ends by supports 94.

The confined region in the right portion 90a may be provided with damping mechanisms to damp out the confined vibrational energy. The damping mechanisms illustrated are constrained layer dampers 96 that advantageously conform to the topography of the shell structure. The constrained layer dampers 96 are advantageously positioned at the location in the right portion 90a that is subject to the largest vibration translation. The constrained layer damper 96 may be provided in segments disposed around the cylinder 90, as illustrated, or in some other form, such as a ring around the cylinder 90.

The method that is the subject of this application has several advantages over conventional techniques. As pointed out earlier, the delivery of more energy to a damping mechanism allows the damper to dissipate more energy. However, in conventional techniques, high vibration energy is delivered to the dampers only near the resonant frequencies, and the damping of the system is ineffective at frequencies away from the resonant frequencies. The present invention confines vibration energy to a designated spatial region of the system over a broad frequency range. Thus, a greater fraction of the vibrational energy is delivered to the damping mechanism than with conventional methods.

The VCC-CDE method may also enhance the effective frequency range of the damping performance. Each confined vibration mode participating in the response may deliver more energy to the dampers than for the non-confined modes over a wide range of frequencies. This focusing of vibration energy may increase the response of the system in the confined region and resemble a resonance condition for the frequency range for which the modes are confined. Because more of the system vibration energy is delivered to the damper at all frequencies, the effective frequency range of dampers is increased to a range beyond the system resonances.

The efficiency of various conventional damping mechanisms may be improved by placing the damping mechanisms in more effective regions of the structure. This results in greater vibration energy dissipation, and reduced dependence on: a) the amount of damping material, b) the number of damping elements, or c) the required damping factor of the damping mechanism. Increasing the damping performance efficiency through the application of VCC-CDE allows the damping mechanism to dissipate vibration energy more quickly than conventional methods.

Furthermore, the conventional approach to maximizing damping effectiveness is to optimize damping characteristics to dissipate vibration energy after the energy distribution is set in the designed structure. Rather than attempting to optimize the damping based on an arbitrary distribution of vibration energy, as with the prior art, the VCC-CDE approach to damping optimization is proactive in that the system is designed to deliver the maximum energy to the damping mechanism so as to take full advantage of the damping capabilities.

It will be appreciated that, in addition to passive damping systems, active damping components may be used for damping the vibrational energy in confined regions of a structure. Typically, forces responsible for dissipating vibration energy in, for example, viscous type damping are proportional to the relative velocity between the damper and the structure at the location of the damper. By supplying forces proportional to the velocity of the structure at the location of the damper, in a closed loop, sensor-actuator system, it is possible to boost the damping forces active in a system.

Figure 10:
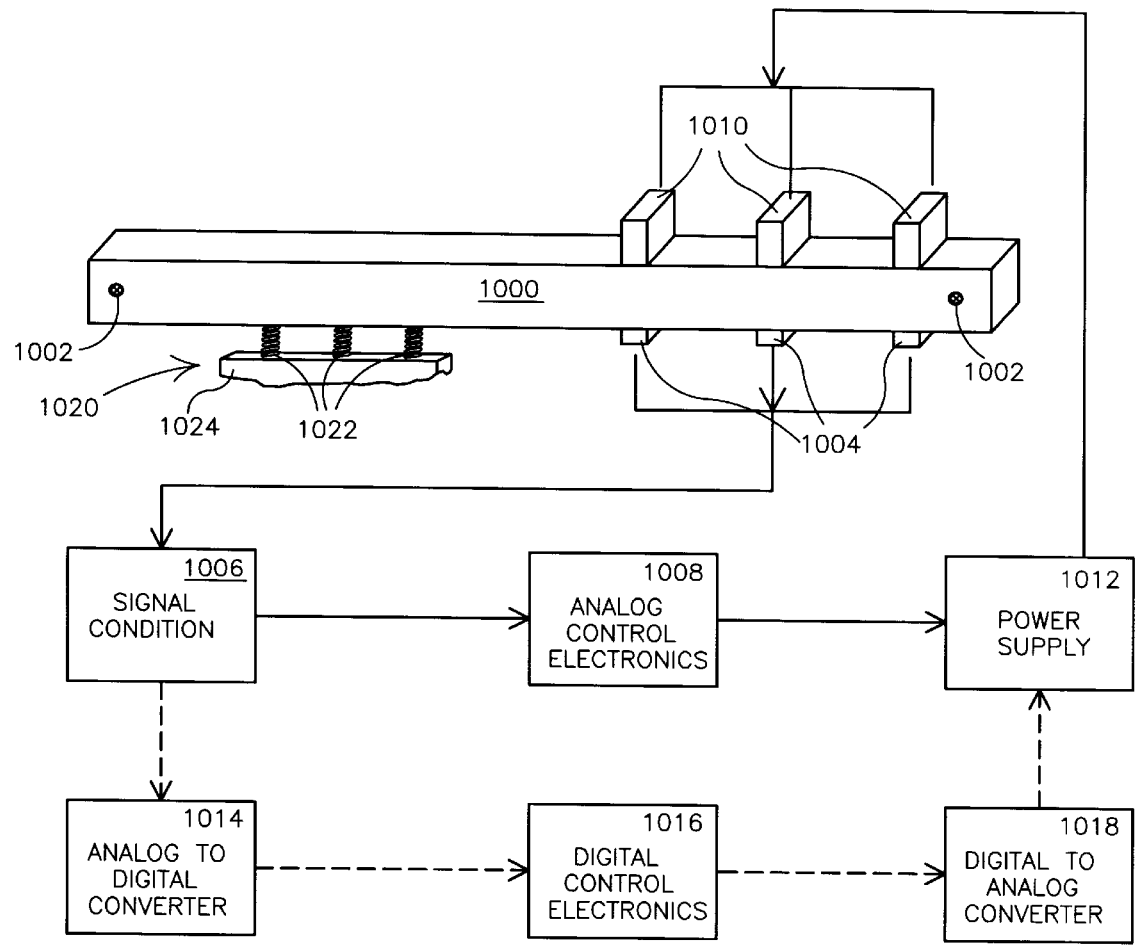
FIG. 10 illustrates a structure having vibration confinement and active vibrational damping.

An active damping system is illustrated in FIG. 10. Here the structure is illustrated as a beam 1000 pinned at each end 1002. A vibration confinement device 1020 is provided to confine vibrational energy to a specified portion of the beam 1000, in this case to the right side of the beam 1000.

Sensors 1004 are disposed at intervals along the beam 1000. The sensors 1004 detect the local displacement, velocity, or acceleration of the beam 1000. Sensor signals are received by a signal conditioner 1006 and then directed to an analog control circuit 1008. The analog control circuit 1008 analyzes the signals from the sensors 1004 and produces control signals to control active damping elements 1010, for example pneumatic, hydraulic, electromagnetic, magnetic or piezoelectric actuators, or theological fluid dampers, provided at various locations along the beam. The control signals from the control circuit 1008 are directed to the power supply 1012 and then on to the active damping elements 1010. In one particular approach to controlling the active damping elements 1010 so as to actively damp vibrations in the beam 1000, the sensors 1004 measure the local velocity of the beam 1000. The control circuit 1008 multiplies the sensor signals by a negative gain factor to produce the control signal for the active damping elements 1010. Such an approach is referred to as direct velocity feed-back control. It will be appreciated that the displacement or acceleration may be measured, and the signal differentiated or integrated, respectively, to feed a negative gain signal back to the beam 1000. Where the sensors 1004 are displacement sensors, the sensors 1004 may be of the RC series of sensors produced by Philtec Inc. Other displacement sensors are produced by, inter alia, Optodyne, Inc. and Balluf, Inc. Examples of velocity or acceleration sensors include MM0002 velocity transducers or type 4394 accelerometers, produced by Bruel and Kjaer. Other velocity and acceleration sensors are available from, inter alia, Endevco, PCB Piezotronics, Inc. and Wilcoxon Research.

Although the figure illustrates that the sensors 1004 are separated from the active damping elements 1010, it will be appreciated that there is an advantage to locating the sensors 1004 directly beside the active damping elements 1010 or even between the active damping elements 1010 and the beam 1000.

Analog signal and acquisition hardware may include, for example, the model type 3550, supplied by Bruel and Kjaer, or as supplied by Hewlett Packard. Other signal conditioners are produced by PCB Piezotronics, Inc. and Wilcoxon Research, amongst others.

It will also be appreciated that feed-back control of the active damping elements 1010 may be performed digitally, as well as using analog circuits. Where a digital approach is followed, the signal from the signal conditioner 1006 is converted to a digital signal in the analog-to-digital converter 1014, and the digitized signal then transmitted to digital control electronics 1016, which may include a processor. Once the processor has determined the appropriate damping required for the measured vibration, the processor directs a control signal to the digital-to-analog converter 1018. The digital-to-analog converter 1018 directs an analog signal to the power supply 1012 to the drive active damping elements 1010. Digital signal acquisition hardware may include a portable data acquisition system such as the Wavebook/512 produced by IOtech. Other digital signal acquisition hardware is available from, inter alia, Keithley Instruments, Inc. and National Instruments. The digital control software 1016 may be, for example, the DASYLAB, produced by IOtech. These software products may be run on a number of computer systems, including personal computers, such as IBM-compatible PCs or Macintosh-compatible computers, or other computers.

The active damping elements 1010 may be provided with translating actuators, so that the actuators 1010 may be moved to different positions on the beam 1000, for example in order to optimize damping of the confined energy. The translating mechanisms may be operated under direct control of the control electronics 1008, 1016.

A number of the variations of the circuit illustrated in FIG. 10 may be used. For example, the system may use one or more sensors and one or more actuators, where the sensors and actuators are not co-located. Also, the sensors and actuators may be co-located, and may also be coupled so that a sensor and an actuator function together as a single unit. It will be appreciated that the control circuits 1008, 1016 are adapted to produce actuator signals within certain limited values, so as to maintain system stability. Also, the phases of the actuator control signals may be controlled relative to the vibration of the beam 1000 to apply the forces to the beam at the correct times within the vibration cycles.

It will be appreciated that active damping is not restricted to use with passive vibration confinement, but may also be implemented with active vibration confinement, as described in U.S. patent application Ser. No. 08/512,070, now abandoned, incorporated herein by reference. Accordingly, a system may have both passive vibration control and damping, both active vibration control and damping, or one of vibration control and damping being active and the other passive.

Various confinement or mode localization indicators may be used to predict the occurrence of the localization of modes, i.e., vibration confinement, and also to describe the severity of the confinement. These indicators may also be used in optimization procedures, for designing optimized structures having vibration confinement and concentrated damping elements. In the following description, mode localization and vibration confinement should be understood as describing the same phenomenon. Also, the term "degree of localization" describes the severity of vibration confinement. Three methodologies are described here, namely 1) the geometry method, 2) the peak deflection ratio method, and 3) the localized modal mass method.

Geometry Method

Figure 11:
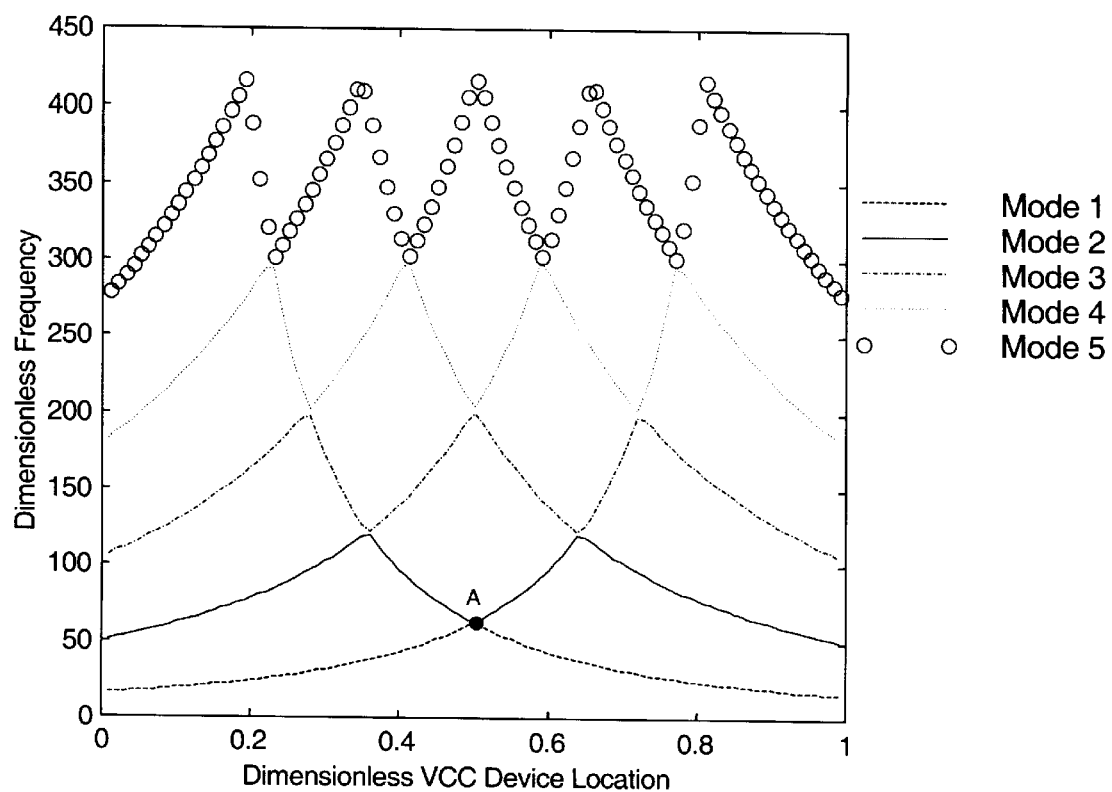
FIG. 11 illustrates the relationship between vibration frequency and the position of confinement device for a beam, for various vibration modes.

FIG. 11 illustrates the dimensionless frequency for the first five vibration modes of a beam as a function of a vibration confinement device's dimensionless position along the beam, as described in U.S. patent application Ser. No. 08/850,285. Frequency plots of this type may be used to illustrate the frequency behavior of various vibrational modes of different structures. When the veering (or crossing) of the frequency curves occurs, for example as illustrated at point A, then mode transition or localization may occur. M. Triantafyllou and G. Triantafyllou have shown in "Frequency Coalescence and Mode Localization Phenomenon: A Geometric Theory", Journal of Sound and Vibration, vol. 150, pages 485–500, (1991), incorporated herein by reference, the use of a geometrical description to explain the occurrence of frequency crossing and veering. Veering or crossing occurs when one of the system parameters, p, such as the position of the confinement device, is varied over a specified range. The natural frequencies and the system parameters may be assumed to be complex. It has been shown that frequency crossing and veering can be uniquely characterized in terms of a saddle point in the complex $\omega$ plane and a saddle/branch point in the complex parameter plane.

The geometry method may be used to predict the range of parameters which may induce mode localization. However, the degree of localization is not provided by the geometry method, and therefore, another indicator method is also required to predict the degree of localization. It should also be noted that not all cases of frequency veering or crossing result in mode localization and the vibration. Therefore, an alternative method is required to verify that veering or crossing results in mode localization.

Peak Deflection Ratio (PDR) Method

The degree of localization of a mode may be measured using the peak deflection ratio, A, where A is the ratio of the magnitudes of the highest peak and the lowest peak of a localized mode. This method provides reasonable accuracy in handling simple mode shapes of simple structures. The PDR method is also suitable for calculating the vibration confinement on a point-by-point basis. However, in complex mode-shaped structures, such as plates and shells, the PDR indicator may be difficult to implement because of the requirement to implement a tedious search routine to identify the peaks of vibration modes. The advantages of this method depend on how the sub-domains of the structures are divided. The PDR method is well suited to determining the degree of localization where it is known that localization has occurred. The PDR method provides little or no information at the design stage to predict whether the modes are localized or where the energy is localized in the structure.

To illustrate the use of the PDR method, the confinement criteria set by the designer may include that, for a particular portion of the structure, the ratio A has to be in excess of a predetermined value, for example 10. The designer then locates the position of the highest and lowest peaks in the confined area of the structure, and takes the ratio of their magnitudes. If the ratio is higher than the predetermined value, then the PDR confinement criterion is met.

Localized Modal Mass Method

Another indicator that may be used in determining the degree of localization of a specific mode in a designated region of a structure is the localized modal mass (LMM) method.

The localized modal mass, $M_m$, is defined by the following equation:

$$M_n = \frac{\int_{\Omega l} u_n^2(x, y) dy dx}{\int_{\Omega u} u_n^2(x, y) dy dx}$$

Here the numerator is the normalized modal mass over the suppressed region ($\Omega_l$) while the denominator is the modal mass over the region where any vibration energy is concentrated, and therefore deflections are at a maximum ($\Omega_u$). For steady state vibrations, the velocity is proportional to the displacement (amplitude) and the frequency of vibration. In other words, the modal mass of a specific region is proportional to its kinetic energy. Therefore, the localized modal mass reflects how much kinetic energy is distributed within a specific region of a structure, and so the degree of localization can therefore be determined. An advantage of the LMM method is that it may be used to represent modal energy localization in a specific region of a structure, or to represent the modal energy ratio between different regions according to the design.

The LMM indicator reflects mode localization within a region of the structure. This contrasts with the PDR method which reflects localization at only a point within the region. Incorporation of the LMM indicator in computer software is more straightforward than incorporation of the PDR indicator, because the modal information is available and there is no need to search for maximum and minimum deflection points, as there is in the PDR method. This advantage makes the LMM indicator more flexible for use.

Design of VCC/CDE System

Computer models may be used to determine appropriate design parameters and their acceptable ranges that result in vibration confinement, i.e., a localized modal response. The computer models may also be used to optimize the design of the structure based on a set of localization criteria defined by a designer.

The input to the computer model may include material and structural data, design parameters and their allowable ranges, confinement requirements, and a localization indicator. The computer program may handle up to a specific number, n, of design parameters, and may be extended to incorporate a larger number of design parameters. The confinement requirements may describe in which structural components vibrational energy is to be localized, the frequency range of interest, and the severity of confinement.

There exist different approaches to optimizing the design of a structure having VCC or VCC/CDE. These optimization processes are different from conventional optimization routines because they require specific input information relating to vibration confinement and damping and they produce an output with optimized vibration confinement and damping parameters. The output may, for example, identify a suitable region for confinement to achieve the desired performance and confinement objectives. This process may be utilized both for optimizing design parameters based on VCC alone or in conjunction with other performance criteria based on VCC, such as damping performance.

Figure 12:
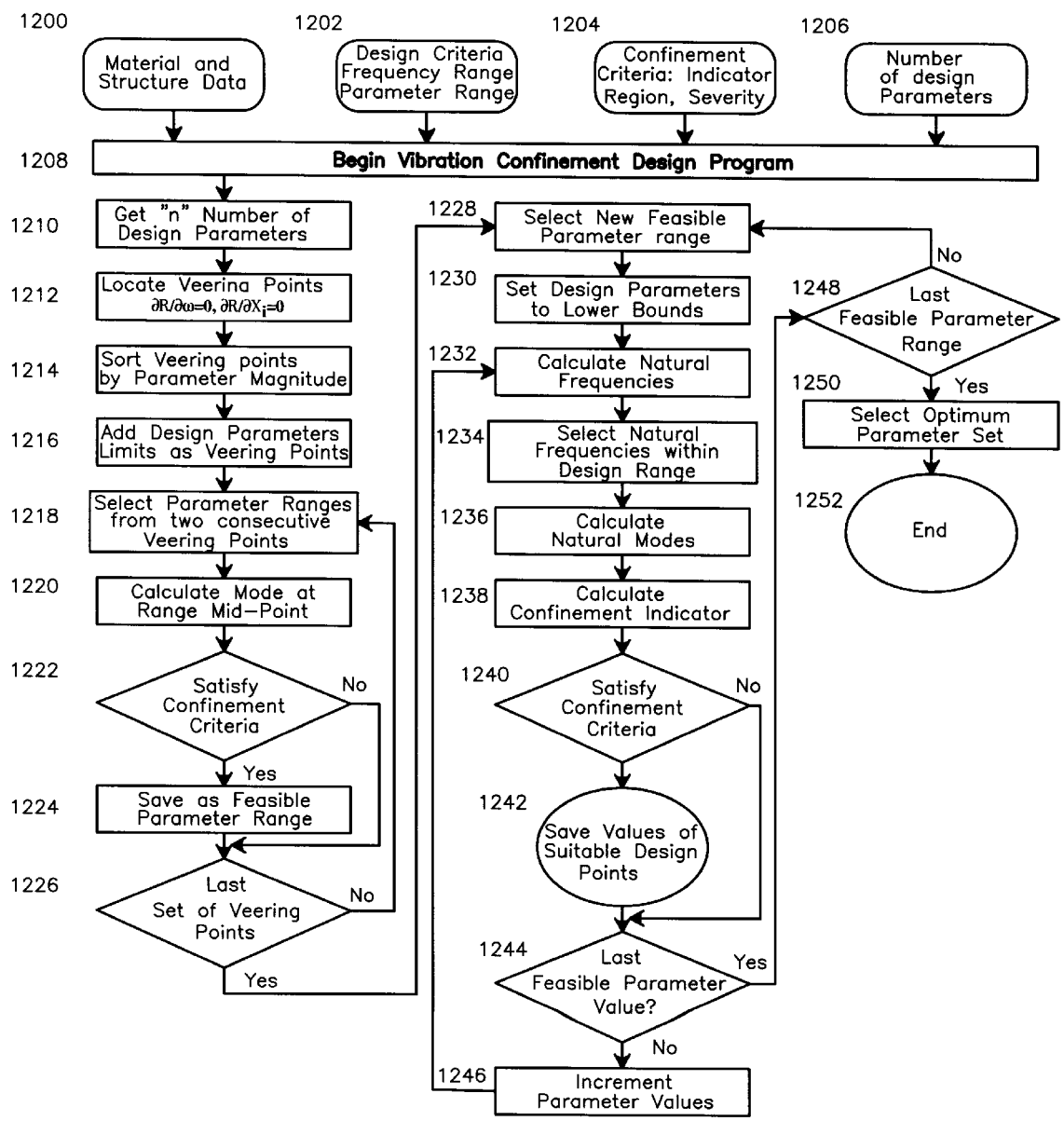
FIG. 12 illustrates steps in a first method for optimizing the design of a structure having vibration control by confinement and concentrated damping.

The steps of one particular optimization method are illustrated in FIG. 12. Steps 1200, 1202, 1204 and 1206 are related to inputting various information into the program. Exemplary input information for each step is presented in Table I, which contains input data related to an optimization procedure for determining the optimum position and thickness of the vibration confining rib for the plate illustrated in FIGS. 6B and 6D. It is assumed that the rib is securely fixed to the surface of the plate.

TABLE I

Input Parameters For Optimization Procedure

Material and Structural Data (step 1200)
Plate and rib materials (steel ASTM-A36)

| | |
|---|---|
| Young's modulus: | $29 \times 10^6$ p.s.i |
| Shear Modulus: | $11.5 \times 10^6$ p.s.i |
| Density | $0.73 \times 10^{-3}$ lb-s$^2$/in (0.284 lb/in$^3$) |
| Poisson's Ratio: | 0.3 |

Plate Geometry

| | |
|---|---|
| Length | 32 in |
| Width | 18 in |
| Thickness | 0.05 in |

Rib Geometry

| | |
|---|---|
| Length | 18 in |
| Width | 1.5 in |

Design Criteria (Step 1202)

Frequency Range: 0–200 Hz
Parameter ranges rib thickness 0.35 in +/−20%
rib position 10.56 in from edge of plate +/−10%

Confinement Criteria: Indicator, Severity, Region (Step 1204)

Indicator: peak deflection ratio
Severity confinement criteria: peak deflection ratio 10:1 confined to unconfined.
Region: large portion of plate (to the right of the rib in FIGS. 6C and 6D).
Number of design parameters = 2 (rib thickness and position) (Step 1206)

In step 1200, the designer selects the material and structural data to be used in the calculation. This input may include structural geometric and material properties of the structure, used in characterizing the structure for analysis. The material properties considered may include the Young's modulus, shear modulus, density and Poisson's ratio for the different components of the system. In the example, both the plate and the rib are formed from the same type of steel (ASTM-A36). The structural properties may include the sizes of the various system components, such as length, width and thickness.

This input may also include design parameters and the allowable variation in design parameters to ensure that the optimized structure will meet criteria for geometric and material constraints after the structural changes necessary to induce vibration confinement have been introduced. For example, rather than providing a single value for the rib width, the input may include a range of acceptable rib widths.

The system structural data may also include system performance specifications to ensure that the optimized structure meets operational and functional specifications after the structural changes necessary to induce vibration confinement and damping are introduced. These specifications may be limits on displacements, stresses, fatigue and the like. It may also include vibration characteristic data, such as natural frequencies, mode shapes, or even a specified total structural response, where the vibration characteristics are specified to meet function or performance requirements.

The structural requirements may also include damping properties, including the position and damping characteristics of damping elements. Damping elements may also be prescribed as an input if they are expected to significantly affect the vibration characteristics of the structure to be optimized (e.g., added mass or stiffness characteristics). For example, if the constrained layer damper 66, illustrated in FIG. 6D, presents significant values of Young's modulus, shear modulus, density and Poisson's ratio, then these properties are included as inputs at this step so as to permit a more accurate calculation of the vibrational modes.

Additional damping physical characteristics (e.g., geometry restrictions, material properties, interface requirements, temperature dependence, etc.) or the type of damping mechanism (e.g., constrained layer damping, fluid-filled dashpots, etc.) may also be structural data input to the optimization routine.

In step 1202, various design criteria and parameter ranges are selected for study. For the example under discussion, the design criteria are restricted to vibration frequencies in the range of 0–200 Hz. The parameter ranges to be studied are provided as the rib thickness (0.35 in, +/−20%) and rib position (10.56 in from edge, +/−10%). Thus, the input of this example includes the position of the confinement device and its effective translational and torsional stiffnesses. Other inputs at this step may include the concentrated damping element specifications. Included among the damping element specifications may be the geometry or placement of the concentrated damping elements or the physical parameter to which the damping mechanism responds (e.g., velocity, strain energy, etc.) Damping performance characteristics (e.g., targeted frequency range or vibration modes) may also be design variable inputs for the optimization routine. The input at this step may also include other factors to optimize, for example, for cost, weight, manufacturability, implementation and the like.

In step 1204, the various confinement criteria, the indicator of confinement and the severity of confinement are selected. For the illustrative example, the indicator of confinement is selected as the peak deflection ratio, and the severity of confinement is selected as a peak deflection ratio of at least 10:1 between the confined and unconfined regions. Also, the larger portion of the plate, illustrated as being to the right of the rib in FIGS. 6C and 6D, is selected as the confinement region.

It will be appreciated that the indicator of confinement may also be selected to be the localized modal mass instead of, or in addition to, the peak deflection ratio. Where the localized modal mass is selected, the severity of confinement may be specified as, for example requiring a ratio of at least 10:1 vibrational energy in the confined and unconfined regions.

Where the objectives of the vibration confinement are known, the objectives may be used as a basis for selecting optimal designs. For example, the objective of the illustrative example is to confine vibrational energy to the larger portion of the plate, so that vibrational damping provided in the confinement region can remove vibrational energy. The vibration confinement is deemed to be sufficient when the PDR is 10:1. In a broad sense, the information input at this stage is related to the vibration confinement, covering where the confinement is to occur (for example which regions of the system are selected for confinement), how much confinement is to take place and how it is to be measured (for example PDR or LMM ratios), and how confinement is to be applied (for example what types of confinement device are to be used). To illustrate this last point, consider the rib stiffener of the example. Here, confinement arises from the additional translational and torsional stiffnesses provided to the plate in the area of the rib. These stiffnesses are easily calculable knowing the material properties and geometric extent of the rib. If another type of vibration confinement device were used, for example, a blade-type stiffener attached to a nonvibrating plane, then the additional translational and torsional stiffnesses arising from the blade-type confinement device would be incorporated into the numerical model of vibration of the plate.

An objective to be satisfied by the output may be to specify the optimum design of the confinement device (as in the illustrative example) or to determine an appropriate way to induce confinement within the design specifications. To illustrate, the present example may have included both the width and height of the rib stiffener as parameters to be varied, rather than just position and height. In addition, a comparison may be made between the use of a rib stiffener and some other vibration confinement device, for example a region of reduced thickness stretching across the plate, in a manner similar to that illustrated in FIG. 31, in patent application Ser. No. 08/850,285. An additional consideration when using the region of reduced thickness may be that the plate meet certain strength requirements.

Confinement objectives may include vibration reduction, vibration isolation, vibration amplification, or modification of the system vibration-related characteristics. The distinction between these types of objectives may be illustrated by example. For instance, the vibration in a system may be reduced in order to protect critical components or spatial regions of the system. Uncontrolled vibration in these components may result in degraded system performance, unsafe system operating conditions, increased component failure, or shortened component or system life expectancy. This type of objective was discussed above with regard to FIGS. 14A and 14B.

Another confinement objective may be to amplify the vibration response in a spatial region of the system, rather than reduce vibration in a certain region. Enhanced vibration within a specific region may enhance the performance of some systems. For example, the confinement of vibration energy may enhance the effectiveness of process machinery which rely on the effective transmission of energy to external objects. Examples of such machinery include vibrating mixers, separators, cleaners, grinders, and finishers. Other examples may include vibration transport or processing machines, vibrating elevators, crushers, and motors. Equipment used for surface hardening may also benefit from confined vibration. Additionally, as stated above, the confinement of vibration energy may also enhance the performance of vibration damping elements, vibration sensing instruments, and acoustic radiation in transducers. In such cases, the confinement criteria may, for example, be defined as a preferred ratio between the vibrational energy in the confined region and the unconfined region, in a manner similar to that used in the illustrative example.

Modifications to the vibration-related characteristics of a system may also be beneficial independent of the benefit of reduction or amplification of vibration. Altering the natural frequencies or mode shapes of a system may extend its usefulness. For instance, raising the natural frequencies of a rotating machine may extend the practical range of operating speeds. In such a case, the confinement criteria may include the requirement that one or more natural modes of the confined structure be above a certain minimum value, or within a certain range of values. Also, modification of the vibrational impedance of a system may allow for better energy transmission or absorption.

If the confinement objectives are not pre-determined, confinement regions may be optimized based on the initial non-confined modes of a system, as determined by an optimization routine run at an initial design stage. Further design, such as the placement of critical components on the confined structure, then takes place. An additional optimization pass may be required to finalize the design.

The number of design parameters to be varied during the optimization process, n, is selected at step 1206. In the present example, the number of design parameters to be varied is 2, viz. the rib thickness and its position. The parameters, X, therefore, run from $X_1 \ldots X_n$. In the illustrated case, the parameters are $X_1$ and $X_2$.

The vibration confinement design program is started at step 1208.

The program sets the number of design parameters, input in step 1206 as n. The veering/crossing points for various values of parameter and frequency in step 1212 are identified using the geometry method and stored. This step finds all loci of the veering points in the n-dimensional parameter space. As discussed earlier, the veering/crossing points may be described in terms of the characteristic equation of the vibrating system, R, and its derivatives. Veering and crossing points satisfy the requirements that $R=0$, $\partial R/\partial \omega = 0$, and $\partial R/\partial X_i = 0$. This may be understood in the case of one design parameter (n=1) with the aid of FIG. 11. In this case, R is a function of two variables only, the design parameter, X, and the frequency, $\omega$. The frequency curves represent the roots of the characteristic equation (R=0) as the design parameter varies over its range. The points at which the individual curves veer/cross satisfy the condition that the derivatives of the characteristic equation with respect to the design parameter and frequency vanish. This may be seen as a local extreme (maximum or minimum) in the frequency curve (slope of the curve goes to zero). Point A of FIG. 11 labels such a point. The above argument may also be extended to multiple design variables.

A number of veering/crossing points may exist for different values of one particular parameter, while all other parameters are held constant. Therefore, the veering/crossing points are sorted according to parameter magnitude in step 1214. This facilitates searching for suitable parameter ranges. The design parameter ranges, supplied in step 1202, are applied in step 1216, and maximum and minimum parameter constraints are added as veering/crossing points. This step is used to eliminate parameter sets which may satisfy the confinement requirement, but which do not fall within acceptable design parameter ranges.

Next, a parameter range is selected from two consecutive veering/crossing points in step 1218. This step enables the examination of the modal response between two veering/crossing points, a veering/crossing point and a design parameter constraint, or between two design parameter constraints. The form of mode shape remains the same between any two consecutive points. However, the severity of any vibration confinement occurring within the confinement region may change within the selected parameter range.

The natural frequencies and the mode shape are calculated at the mid-point of the parameter range in step 1220. All modes calculated for the given parameter values exhibit confinement if confinement occurs. This step may also be used to identify whether vibration confinement is occurring in the selected region of the structure.

At step 1222, it is determined whether the modes calculated in step 1220 satisfy the confinement criterion. If so, then the program saves this parameter range, in step 1224, for further examination at a later stage. If all sets of veering points have been examined, the loop is exited at step 1226. However, if there are more sets of veering points to be examined, then the loop returns to step 1218.

At step 1228, a new feasible parameter range is selected from those parameter ranges stored at step 1224. The parameter values are then initialized to their lower limits in step 1232, and the natural frequencies are calculated in step 1232. Natural frequencies that are within the desired frequency range are then selected in step 1234. This is used as a check so as not to over-constrain the requirements on the optimized design.

At step 1236, the natural modes of the structure are calculated for the given parameter values, and the confinement indicator, e.g. using the peak deflection or the localized modal mass method, is calculated in step 1238. If the calculated mode shape satisfies the confinement criteria, step 1240, then the values of suitable design points are saved, in step 1242.

If the last feasible parameter has been reached, as determined in step 1244, then the loop is exited to consider whether the last feasible parameter range has been examined, at step 1248. If the last feasible parameter has not been reached, as determined at step 1244, then the parameter values are incremented, at step 1236, and the loop restarted at step 1232.

Once the loop has been exited at step 1248, there may be one or more parameter sets which provide confinement satisfying the confinement and damping criteria. If there is more than one, then an optimized parameter set is selected, at step 1250. The optimized set may, for example, be the set that produces the greatest severity of confinement.

Table II shows the optimized output parameters produced using the first optimization procedure, illustrated in FIG. 12, for the input parameter set of Table I. This example refers to optimization of the position and thickness of the rib stiffener illustrated in FIG. 6D. One of the confinement objectives was the reduction of the amount of damper material used in the confined region while maintaining confinement performance to meet the criterion of one half of the modes within the selected frequency range being confined in the confinement region of the plate.

The boundary conditions of the plate were assumed to be: $u_{edge}=0$, and $\partial u/\partial x$ and $\partial u/\partial y$ unconstrained, where $u_{edge}$ is the displacement of the edge of the plate from its equilibrium position and the plate is taken as lying in the x-y plane. From previous examination of such a plate, it was expected that eight modes would fit within the frequency range selected.

TABLE II

Optimized Output Parameter Values from Optimization Procedure. optimum parameter set: (step 1250)

Rib thickness: 0.3 in
Rib location: 11.2 in from edge.

In this example, the degree of confinement was maximized in order to place the maximum amount of vibration energy in to the region where the damping material was placed. After the degree of confinement was maximized, the rib thickness was reduced (without significantly affecting confinement) in order to produce a lighter structure.

This optimization procedure was illustrated for a fairly simple structure, i.e. a plate. However, it will be appreciated that these procedures may also be employed in optimizing vibration control of substantially more complex structures.

Figure 13:
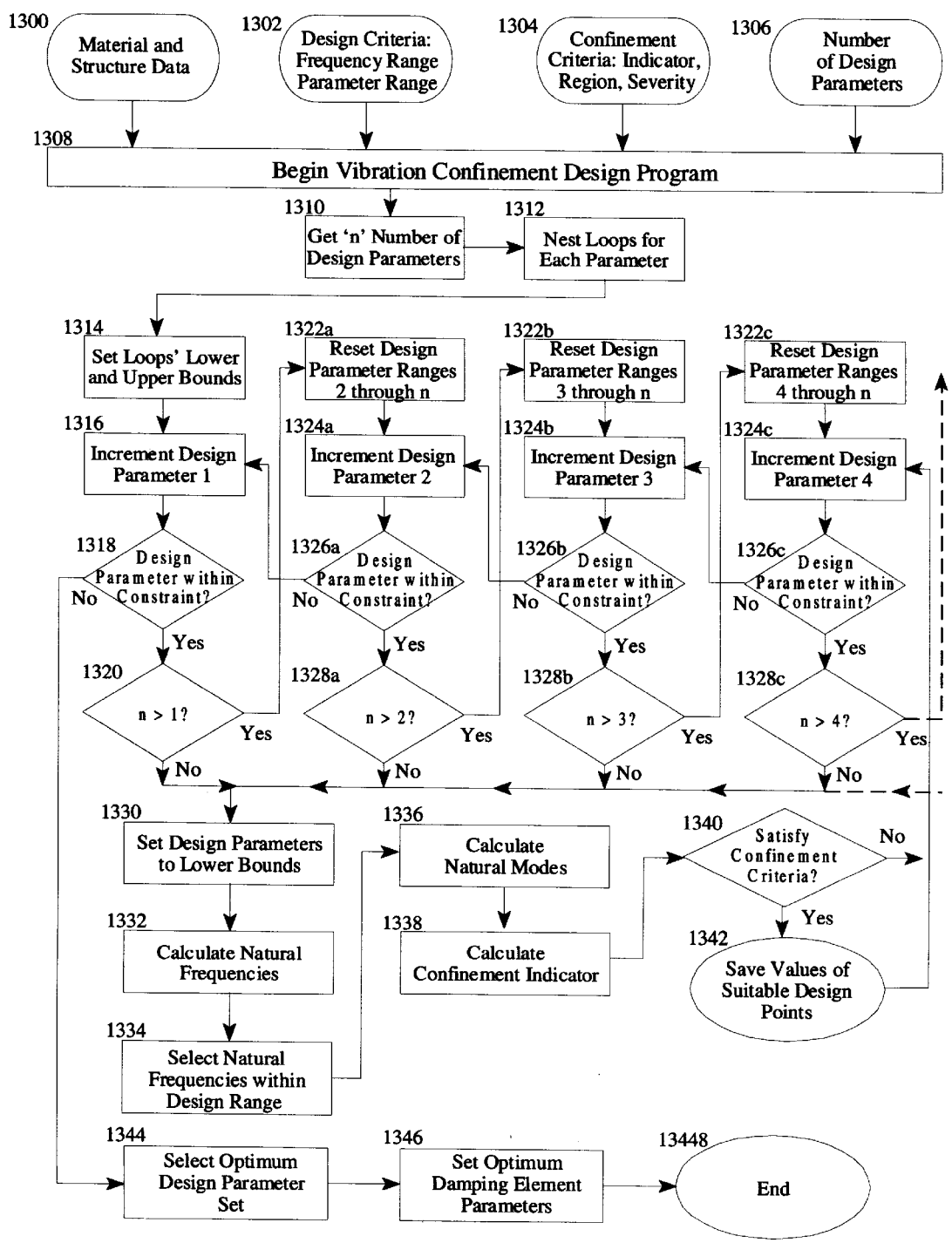
FIG. 13 illustrates steps in a second method for optimizing the design of a structure having vibration control by confinement and concentrated damping.

FIG. 13 illustrates another approach to producing an optimized design for a structure with VCC and CDE. Here, the steps labeled 1300, 1302, 1304, 1306, 1308 and 1310 correspond respectively to steps 1200, 1202, 1204, 1206, 1208, and 1210.

Nested loops are set up for each of the n parameters in step 1312. The upper and lower bounds for each parameter, received as input in step 1302, are set up in step 1314. The loop for the first parameter commences at step 1316 by incrementing $X_1$, the first design parameter. $X_1$, is tested to ensure that it is within its selected constraints at step 1318. If it is within the constraints, then the number of parameters is checked to see if there are any more to be incremented at step 1320. If there are more parameters, then the program proceeds to reset the remaining parameters $X_2$ to $X_n$ at step 1322a. $X_2$ is incremented 1, at step 1324a and checked to ensure that it is within the parameter constraints at step 1326a.

If there are more parameters to be incremented, as determined at step 1328a, then the program goes through similar loops for parameter 3, steps 1322b, 1324b, 1326b and 1328b. Similar incrementing loops are provided for each parameter up to n. For example, the loop having steps 1322c, 1324c, 1326c and 1328c is employed for incrementing parameter 4. Higher loops, if needed, are accessed by the dashed lines. Each nested loop acts like a counter. Once the parameter $X_i$ in a particular loop reaches its upper value (as determined in steps 1326), the loop for the parameter $X_{i-1}$, is incremented (steps 1324) and the loop for $X_i$ is reset to the lower constraint (steps 1322).

As the parameters $X_1-X_n$ are incremented, the natural frequencies of the structure are calculated for each set of parameter values in step 1332. Those frequencies within the design range of interest, as input in step 1302, are selected in step 1334. The natural modes of the structure are then calculated in step 1336. The confinement indicator, e.g. the peak deflection method or localized modal mass method, is calculated for the present set of parameter values in step 1338. The confinement criteria are tested against the indicator at step 1340 and, if confinement as been determined to occur, then the parameter values producing the confinement are stored, at step 1342. Whether or not confinement has been calculated to occur, $X_n$ is incremented at step 1324n (shown as 1324c where n=4) and the nested loop produces the next set of parameter values for testing.

Once the confinement indicator has been calculated for the n-dimensional parameter space, the program examines the various parameter sets saved in step 1342, and performs a comparison to produce the optimum set, at step 1344, based on input criteria selected by the designer at steps 1302 and 1304.

It is understood that each of the devices and elements or combinations of elements described in this patent application may also be applied to other structures and machine applications where vibration energy is to be dissipated by VCC-CDE. In particular, VCC-CDE can be applied to flexible structures and machinery whose gross motion is either static or dynamic. The concepts discussed may be extended from simple systems to large and complex systems. No restriction to the number of physical dimensions for the structure or machinery or to the direction of vibratory motions is intended.

Figure 17:
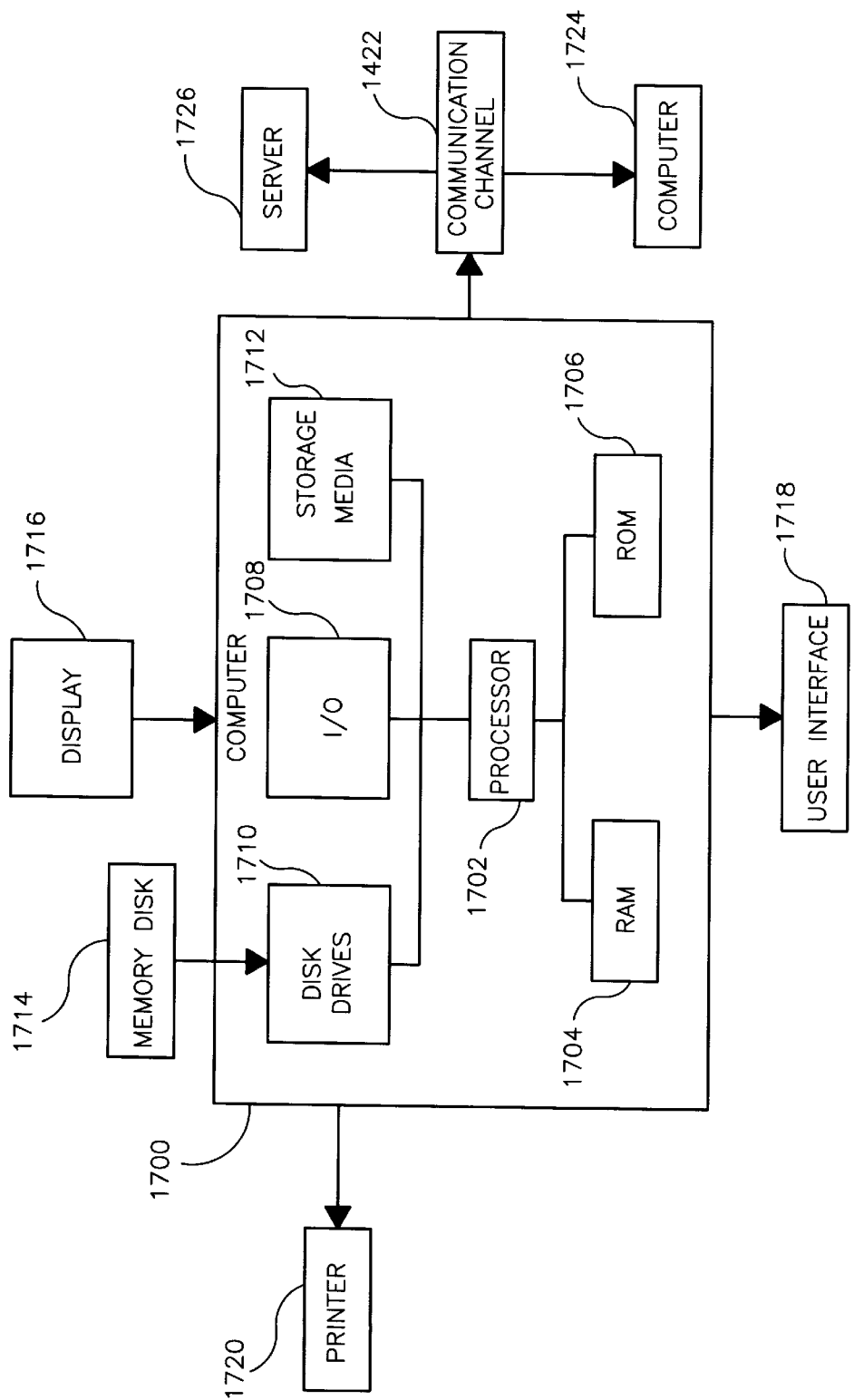
FIG. 17 illustrates in block schematic format an embodiment of a computer for performing an optimization procedure according to an embodiment of the invention.

Referring now to FIG. 17, a system block diagram of a computer system 1700 is shown. The computer system 1700 may be coupled to a network of other computers and servers which together provide a distributed vibration confinement optimization capability. A computer 1700 suitable for calculating optimized vibration confinement parameters in accordance with the present invention typically includes a central processor (CPU) 1702 coupled to random access memory (RAM) 1704 and read-only memory (ROM) 1706. The processor 1702 communicates with other internal and external components through input/output (I/O) circuitry and bussing 1708. The computer 1700 may also include one or more data storage devices, including hard and floppy disk drives 1710 and other memory storage media 1712, such as a CD-ROM, backup disk or tape unit, or the like. In one particular embodiment, optimization software of the present invention may be stored and distributed on a magnetic memory disk 1714, which may be inserted into, and read by, the disk drive 1710. The computer 1700 may also be coupled to a display 1716, a user interface 1718, such as a mouse and keyboard, and a printer 1720. The user typically inputs data to, and executes, the optimization program by interfacing with the computer through the user interface 1718 and display 1716.

The I/O circuit and bus 1708 of the computer 1700 is may be coupled to a communication channel 1722 which, in turn, provides communication with one or more remote computers 1724, a server 1726, or other external systems, such as those that constitute the Internet. In one embodiment, a user may initiate a vibration confinement optimization routine from a remote computer 1724 which communicates with an external server, such as server 1726, for purposes of browsing, linking and importing objects that may be stored on the server 1726. Accordingly, the optimization routines in accordance with the present invention may be operable on a stand-alone computer system, as well as on a distributed network system.

While various examples were provided above, the present invention is not limited to the specifics of the examples. For instance, vibration control was discussed in terms of a beam, a rotating shaft, a plate, and a cylindrical shell. Vibration Control by Confinement may also be applied to other types of structural elements including, but not limited to, other shapes of shells, irregularly shaped plates and partial shell structures. Additionally, although each structure illustrated has only shown one region of vibration confinement, it will be appreciated that a structure may also be provided with two or more vibration confinement regions.

As noted above, the present invention is applicable to controlling vibration in different types of mechanical structures. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A method for reducing vibrational energy in a structure having a vibrating member using a vibration confinement device and a vibration damping element, the vibrating member having boundaries and vibrating relative to the boundaries, the method comprising:

selecting a vibration confinement region in the vibrating member relative to the boundaries;

determining an effective torsional stiffness and an effective translational stiffness for the vibration confinement device;

determining an operating position relative to the boundaries for the vibration confinement device on the vibrating member to define a determined position;

determining a damping position for the damping element on the vibrating member, within the vibration confinement region;

positioning the vibration confinement device at the determined position, thereby confining vibrational energy to the vibration confinement region;

positioning the damping element at the damping position of the vibrating member; and dissipating the vibrational energy from the vibration confinement region by the vibration damping element, wherein the vibration damping device is an active vibration damping device.

2. A method for reducing vibrational energy in a structure having a vibrating member using a vibration confinement device and a vibration damping element, the vibrating member having boundaries and vibrating relative to the boundaries, the method comprising:

selecting a vibration confinement region in the vibrating member relative to the boundaries;

determining an effective torsional stiffness and an effective translational stiffness for the vibration confinement device;

determining an operating position relative to the boundaries for the vibration confinement device on the vibrating member to define a determined position;

determining a damping position for the damping element on the vibrating member, within the vibration confinement region;

positioning the vibration confinement device at the determined position, thereby confining vibrational energy to the vibration confinement region;

positioning the damping element at the damping position of the vibrating member;

dissipating the vibrational energy from the vibration confinement region by the vibration damping element; and adjusting at least one of the translational stiffness, the torsional stiffness and the operating position of the vibration confinement device so as to enhance confinement of vibrational energy to the vibration confinement region.

3. A method of actively controlling vibrational energy in a structure having a vibrating member using a vibration confinement device and a vibration damping element, the vibrating member having boundaries and vibrating relative to the boundaries, the method comprising:

selecting a vibration confinement region in the vibrating member relative to the boundaries;

determining an effective torsional stiffness and an effective translational stiffness for the vibration confinement device;

determining an operating position relative to the boundaries for the vibration confinement device on the vibrating member to define a determined position;

positioning the vibration confinement device at the determined position to create a vibration confinement region;

positioning an active vibration damping element within the vibration confinement region of the vibrating member;

positioning a sensor on the vibrating member to sense vibration of the member and to generate a sensor signal in response to the sensed vibration of the member; and controlling the active damping element in response to the sensor signal so as to dissipate vibration energy of the vibrating member.

4. The method according to claim 3, further comprising generating a damping control signal in a controller in response to the sensor signal, and transmitting the damping control signal to the active damping element.

5. The method according to claim 3, wherein the step of controlling the active damping element comprises adjusting the position of the active damping element.

6. The method according to claim 3, wherein positioning the vibration confinement device includes positioning a passive vibration confinement device.

7. The method according to claim 3, wherein positioning the vibration confinement device includes positioning an active vibration confinement device.

8. The method according to claim 6, further comprising generating a confinement control signal in response to the sensor signal and transmitting the confinement control signal to the active vibration confinement device.

9. An apparatus for confining vibrational energy in a structure having a vibrating member, the vibrating member having vibration boundary conditions at boundaries thereof, the vibrating member further having a vibration confinement region selected relative to the boundaries, the apparatus comprising:

a vibration confinement device couplable to the member, and having an effective translational spring constant and an effective torsional spring constant, to confine vibrational energy to the vibration confinement region of the structure; and a vibration damping element coupled to the vibration confinement region of the structure to dissipate vibration energy from the vibration confinement region, wherein the vibration confinement device comprises a notched portion of the vibrating member.

10. An apparatus for confining vibrational energy in a structure having a vibrating member, the vibrating member having vibration boundary conditions at boundaries thereof, the vibrating member further having a vibration confinement region selected relative to the boundaries, the apparatus comprising:

a vibration confinement device couplable to the member, and having an effective translational spring constant and an effective torsional spring constant, to confine vibrational energy to the vibration confinement region of the structure; and a vibration damping element coupled to the vibration confinement region of the structure to dissipate vibration energy from the vibration confinement region, wherein the vibration confinement device comprises means for applying translational spring forces to the vibrating member, the translational spring forces being applied at respective locations spaced on the vibrating member, the respective locations defining a confinement application region separating the vibration confinement region from an unconfined region of the vibrating member.

11. An apparatus for confining vibrational energy in a structure having a vibrating member, the vibrating member having vibration boundary conditions at boundaries thereof, the vibrating member further having a vibration confinement region selected relative to the boundaries, the apparatus comprising:

a vibration confinement device couplable to the member, and having an effective translational spring constant and an effective torsional spring constant, to confine vibrational energy to the vibration confinement region of the structure; and a vibration damping element coupled to the vibration confinement region of the structure to dissipate vibration energy from the vibration confinement region, wherein the vibration confinement device is configured to apply an effective translational spring force and an effective torsional spring force distributed over a confinement application region of the vibrating member, the confinement application region separating the vibration confinement region from an unconfined region of the vibrating member.

12. An apparatus for confining vibrational energy in a structure having a vibrating member, the vibrating member having vibration boundary conditions at boundaries thereof, the vibrating member further having a vibration confinement region selected relative to the boundaries, the apparatus comprising:

a vibration confinement device couplable to the member, and having an effective translational spring constant and an effective torsional spring constant, to confine vibrational energy to the vibration confinement region of the structure; and a vibration damping element coupled to the vibration confinement region of the structure to dissipate vibration energy from the vibration confinement region, wherein the vibration damping element is an active damping element, and further comprising a sensor positioned on the structure to generate sensor signals in response to detected vibration within the vibration confinement region and coupled to a controller, the controller being coupled to control the active damping element in response to the sensor signals.

13. An apparatus for actively damping vibrational energy confined in a structure having a vibrating member structure, the vibrating member having vibration boundary conditions at boundaries thereof, the vibrating member further having a vibration confinement region selected relative to the boundaries, the apparatus comprising:

a vibration confinement device couplable at a confinement location of the member, and having an effective translational spring constant and an effective torsional spring constant, to confine vibrational energy to the vibration confinement region of the structure;

a vibration detector disposed on the vibrating member to generate a vibration signal;

an active vibration damping element coupled to a damping location of the structure, within the vibration confinement region, to dissipate vibration energy from the vibration confinement region; and a controller to receive the vibration signal and generate a damping control signal in response thereto, the damping control signal being transmitted to the damping element to control a damping characteristic of the damping element.

14. The apparatus of claim 13, wherein the vibration confinement device comprises means for applying translational spring forces to the vibrating member, at spaced locations on the vibrating member, the locations defining a confinement application region separating the vibration confinement region from an unconfined region of the vibrating member.

15. The apparatus of claim 13, wherein the vibration confinement device comprises means for applying torsional spring forces to the vibrating member at spaced locations on the vibrating member, the locations defining a confinement application region separating the vibration confinement region from an unconfined region of the vibrating member.

16. The apparatus of claim 13, wherein the vibration confinement device is configured to apply an effective translational spring force and an effective torsional spring force distributed over a confinement application region of the vibrating member, the confinement application region separating the vibration confinement region from an unconfined region of the vibrating member.

17. The apparatus of claim 13, further comprising a vibration confinement device sensor unit provided on the vibration confinement device to sense operating characteristics of the active vibration confinement device, and to transmit a device operating characteristic signal to the controller, wherein vibration confinement device is an active confinement device and the controller is coupled to control the active confinement device in response to the operating characteristic signal.

18. The apparatus of claim 17, further comprising an actuator provided on the vibration confinement device to adjust at least one of the effective translational spring constant, and the effective torsional spring constant in response to the confinement device control signal.

19. The apparatus of claim 13, further comprising a damping unit sensor on the vibration damping element to sense operating characteristics of the vibration damping element, and to transmit a damper characteristic signal to the controller.

20. The apparatus of claim 13, wherein the damping element is translatable with respect to the vibrating member so as to adjust the damping location.

21. The apparatus of claim 20, further comprising an actuator provided on the damping element to translate the damping element relative to the vibrating member in response to the damping control signal so as to adjust the damping location.

22. A method of dissipate vibration energy within a mechanical structure, the method comprising:
   re-distributing the vibration energy contained within the mechanical structure to a preselected region of the mechanical structure, such that the preselected region of the mechanical structure contains more vibration energy then a remaining portion of the mechanical structure; and
   coupling a damping mechanism to the preselected region of the mechanical structure to dissipate the vibration energy from the mechanical structure,
      wherein the mechanical structure is selected from the group comprising a plate, and shell-type mechanical structures.

23. The method of claim 22 wherein the vibration energy is redistributed by using a confinement device.

24. The method of claim 23 wherein the confinement device is a structure coupled to the mechanical structure.

25. The method of claim 23 wherein the confinement device is a feature formed in the mechanical structure.

26. The method of claim 22 wherein the damping mechanism is either active or passive.

* * * * *